US008245441B1

(12) United States Patent
Domek et al.

(10) Patent No.: US 8,245,441 B1
(45) Date of Patent: Aug. 21, 2012

(54) PULL-DOWN PLANTER HANGER

(75) Inventors: Pamela J. Domek, Estherville, IA (US); Robert M. Carter, Estherville, IA (US)

(73) Assignee: Let's Grow Something, LLC, Estherville, IA (US)

(*) Notice: Subject to any disclaimer, the term of this patent is extended or adjusted under 35 U.S.C. 154(b) by 18 days.

(21) Appl. No.: 12/626,447

(22) Filed: Nov. 25, 2009

Related U.S. Application Data

(60) Provisional application No. 61/200,198, filed on Nov. 25, 2008.

(51) Int. Cl.
*A01G 9/02* (2006.01)

(52) U.S. Cl. .................... 47/67; 47/65.5; 242/130.2

(58) Field of Classification Search ........... 47/67, 65.5, 47/66.6, 39; 248/317, 320, 323, 327, 328, 248/329; 242/130.2; 24/136 K, 136 L, 136 R, 24/115 M
See application file for complete search history.

(56) References Cited

U.S. PATENT DOCUMENTS

| | | | | |
|---|---|---|---|---|
| 3,988,810 A * | 11/1976 | Emery | ............................ | 24/128 |
| 4,187,996 A * | 2/1980 | Ehrlich | ............................ | 242/382.6 |
| 4,238,002 A * | 12/1980 | Hexamer | ............................ | 185/27 |
| 4,384,687 A * | 5/1983 | Lamoureux | ............................ | 242/587.2 |
| 4,635,755 A * | 1/1987 | Arechaga | ............................ | 185/45 |
| 4,669,693 A * | 6/1987 | Kagan | ............................ | 248/318 |
| 4,872,632 A * | 10/1989 | Johnson | ............................ | 248/332 |
| 5,065,971 A * | 11/1991 | Gaube | ............................ | 248/330.1 |
| 6,058,574 A * | 5/2000 | Facey et al. | ............................ | 24/136 R |
| 6,416,026 B1 * | 7/2002 | Porraro | ............................ | 248/317 |
| 7,150,078 B2 * | 12/2006 | van Gijsel et al. | ............................ | 24/115 M |
| 7,346,962 B2 * | 3/2008 | van Gijsel et al. | ............................ | 24/134 R |
| 7,530,519 B2 * | 5/2009 | McDuff et al. | ............................ | 242/385.4 |
| D624,394 S * | 9/2010 | Domek et al. | ............................ | D8/373 |
| 2005/0081441 A1 * | 4/2005 | Mantovani | ............................ | 47/67 |
| 2006/0026898 A1 * | 2/2006 | Klaus | ............................ | 47/66.6 |
| 2006/0283081 A1 * | 12/2006 | Killen | ............................ | 47/67 |
| 2008/0115414 A1 * | 5/2008 | Hogan | ............................ | 47/66.6 |
| 2010/0058659 A1 * | 3/2010 | Zweber | ............................ | 47/67 |
| 2010/0314502 A1 * | 12/2010 | Miles et al. | ............................ | 248/59 |

FOREIGN PATENT DOCUMENTS

| | | | |
|---|---|---|---|
| EP | 193253 A1 | * | 9/1986 |
| GB | 2132172 A | * | 7/1984 |

OTHER PUBLICATIONS

Wikipedia http://en.wikipedia.org/wiki/Constant-force_spring, "Constant-Force Spring" (1 page), Dated Jun. 8, 2009.

* cited by examiner

*Primary Examiner* — Rob Swiatek
*Assistant Examiner* — Lisa Tsang
(74) *Attorney, Agent, or Firm* — McKee, Voorhees & Sease, P.L.C.

(57) ABSTRACT

An apparatus and method for hanging a load from awnings, ceilings or wall brackets, for example a planter or other item to be suspended but selectively lowered. The load is suspended from a cord that is constantly urged to a wound up position on a spool held above the load. The load can be lowered by overcoming the winding force. Optionally, the load can be fixed over a range of lowered positions. In one example, a wedge clamps the cord in any of a range of extended lengths to set different heights of the load. Optionally, the spool can be enclosed. The planter easily and in a controlled manner can be lowered against the winding force with relatively little manual pulling force on the planter. But also, the planter can easily and in a controlled manner by assisted when raised by relatively little manual lifting force.

11 Claims, 35 Drawing Sheets

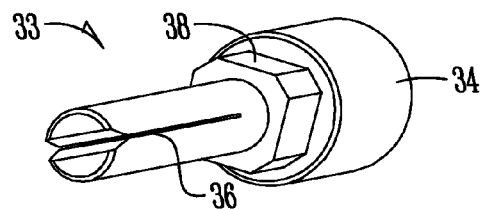
*Fig. 10A*
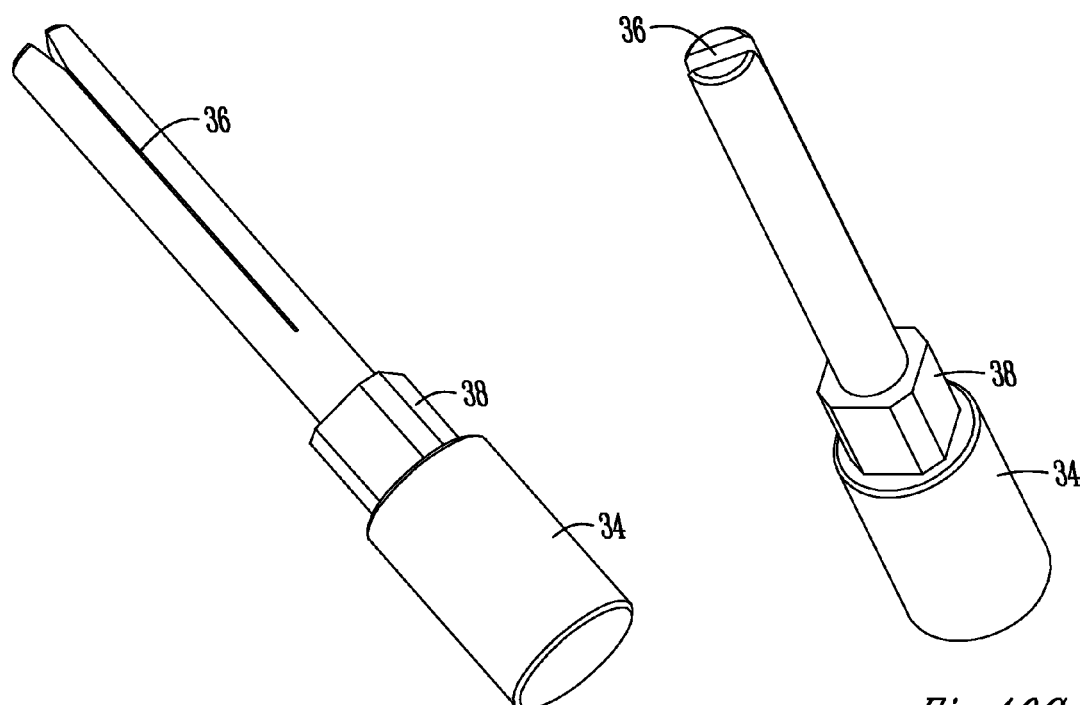
*Fig. 10B*
*Fig. 10C*

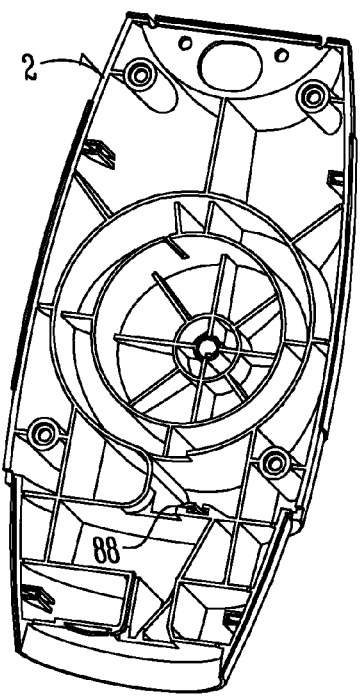 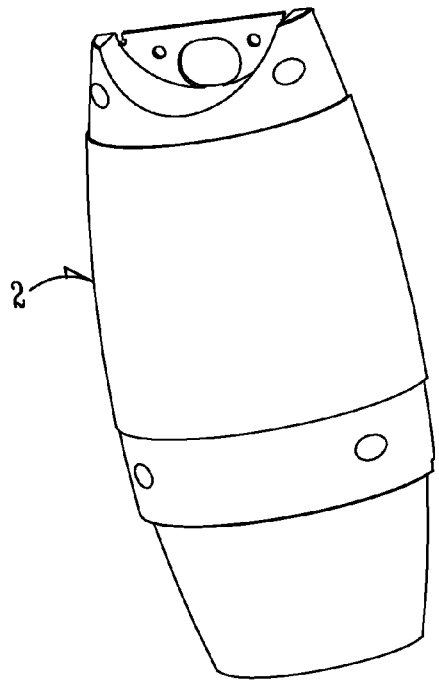
Fig.20A     Fig.20B
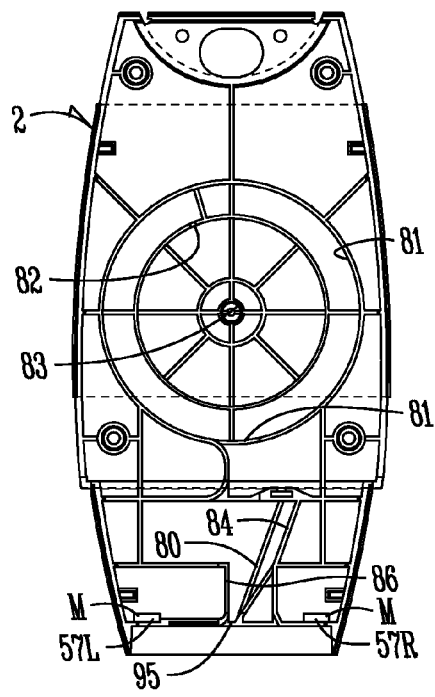
Fig.20C

PULL-DOWN PLANTER HANGER

CROSS-REFERENCE TO RELATED APPLICATIONS

This application claims priority under 35 U.S.C. §119 of a provisional application Ser. No. 61/200,198 filed Nov. 25, 2008, which application is hereby incorporated by reference in its entirety.

I. BACKGROUND OF THE INVENTION

A. Field of the Invention

The present invention relates to items or loads that are desired to be suspended from elevated supported structures such as ceilings, awnings, or wall brackets and, in particular, to a method, device, and system of suspending the item or load but allow quick and easy selectable lowering and full or partial return to the uppermost suspended position. In one aspect of the invention, the item or load is a planter of the type that hang from awnings, ceilings, or wall brackets such as holding flowering or green plants, and in particular, to a method, device, or system to allow the planter to be supported from an elevated structure but be selectively lowered for watering, removal, etc. of plant(s) in the planter or the planter itself, and then full or partial raising towards or back to the original suspended position.

B. Related Art

Planters typically have some type of box or container to hold soil and plants. The planter box can be suspended from a hook or bracket on a supporting structure such as awning, eave, ceiling, or vertical wall, by rope(s) or wire(s) that is/are attached to or cradle the planter box or container.

If the planter box or container is within easy reach from the ground or floor, a person simply hooks or attaches the distal end of the planter support rope or wire to the supporting structure connection. However, the supporting structure (e.g. ceiling, eave, or bracket) is too high to reach from the ground or floor, or if it is desirable for the planter to be elevated, for example, higher than eye level to most people, a step stool or ladder many times must be used to suspend a planter. This must be repeated every time the planter is placed or removed, or for watering or other maintenance of the plant(s) or planter.

There have been attempts to allow selective lowering of a planter for watering or other purposes from an elevated position. They tend to use pulleys and rope or cable. They can be cumbersome as the rope must be carefully pulled and then cleated at a reachable position to elevate the planter, but then, uncleated or untied, the planter box grabbed or manually supported by the user, and then the rope or cable simultaneously grabbed but selectively released and maneuvered to carefully lower the planter box. Sometimes it requires two persons. It also relies on the person(s) to securely re-cleat the rope or cable to avoid the planter from falling to the ground or floor.

A need has therefore been identified in the field of art of hanging planters to allow easy, efficient raising and lowering of a planter. Similar needs exist for suspension and selective lowering and return of other items or loads.

II. SUMMARY OF THE INVENTION

It is therefore a principal object, feature, aspect, or advantage of the present invention to provide a method, apparatus, and system which improves over or improves on the state of the art.

Further objects, features, aspects, or advantages of the present invention include a method, apparatus, or system for suspending a planter or other similar size or weight item or load from an elevated support structure while:
  a. allowing quick, easy, and efficient lowering of the planter, item or load, and then raising to the original position or, optionally, positions in-between lowered and raised;
  b. potentially avoiding the need for a ladder, step stool, or other structure on the floor or ground to raise and lower the planter, item or load;
  c. allowing installation once but then repeated selectable raising and lowering of the planter, item or load;
  d. is substantially maintenance free over an extended period of time, whether used indoors or outdoors;
  e. is economical;
  f. is relatively small in size;
  g. can be embodied in a decorative, aesthetically pleasing form and exterior;
  h. is flexible in its use and the planters, items, and loads it suspends.

One aspect of the invention comprises a unit that attaches at an upper end to an elevated support structure such as ceiling, eave, or wall bracket and includes an attachment member on its lower end to which a hanging planter or other item or load can be attached. Integrated into the unit is a subsystem that allows selective lowering of the planter a substantial distance away from the support structure, and then raising of the planter to any of a range of selected positions relative the support structure. Sometimes by just one hand, a person can release the planter for lowering and then return it upward to any in a range of positions, all while it is securely supported from the elevated support structure. The unit includes an extendable member connected to a lower portion or separable base of the unit. A mechanism in the main portion of the unit can automatically facilitate retraction of the extendable member when the base, and any item or load attached to the base, is raised; but can allow extension of the extendable member when the base, and any item or load attached to it, is lowered from the main portion of the unit.

In one aspect of the invention, the unit includes a base member that can be moved over a range of positions from the bottom of the unit. The base unit is attached to the remainder of the unit by what will be called a cord or tape that can be wound around a spool. The spool is constantly urged to wind the cord up onto the spool. In one example, this is accomplished by a constant force spring. In another aspect of the invention, a cinching or clamping device, in one example a wedge, can wedge or clamp the cord or tape relative to the main portion of the unit, which allows selective separation of the item or load from the main portion of the unit over a range of positions between in abutment to fully lowered.

In another aspect of the invention, the unit includes a configuration wherein the base is held in a fully raised position in abutment with the main portion of the unit by aligned magnets in the base and the main portion the unit. The base can be manually lowered on the cord or tape from the main portion of the unit by pulling the base or any item or load attached to the base with sufficient force to overcome the magnetic attraction. A pre-stressed spring motor can be wound on a central arbor or pin fixed to the spool as the cord or tape is unwound from the spool. So long as the base or item or load attached to the base is pulled down with sufficient force to overcome the spring force, the cord or tape can be further unwound and extended from the spool, all the while further winding the spring motor. This allows the base and any item or load attached to it to be lowered from the main portion of the unit up to the longest extension allowed by the length or the cord or tape. The spring motor presents the spool with a winding force. Thus, when downward force on the cord or tape is released or reduced below the winding force of the spring motor, the cord is wound up on the spool and lifts the base and any item or load attached to it is manually raised.

In another aspect of the invention, a cinching device is initially held in a non-cinching stored position to allow the based and any item or load attached to it to be moved to a fully lowered position. A component fixed along and near the inner end of the cord or tape can mechanically knock or move the cinching mechanism from its magnetic attachment in its stored position when the cord or tape is unwound to almost its fully extended position. Once released from stored position, the cinching mechanism can move by gravity to a cinching position which cinches or clamps the cord or tape to a clamping surface in the main portion of the unit to hold the cord or tape in the extended position, which would hold the base and any item or load attached to it in extended position. However, if the base/item/load is then moved up, the cord or tape tends to displace the cinching mechanism from a cinching position. This allows the spring motor to wind the cord or tape on the spool. The base/item/load can be moved, with manual assistance, all the way back up to abutment with the main portion of the unit (to the fully raised position), or to any position in between fully lowered and fully raised. If upward movement is stopped gravity on the cinching mechanism, tends to move the cinching mechanism back to cinching position so that the base/item/load can be held in any such intermediate position the user selects. Further, as the user releases the item or load, friction between the cord and cinch tends to move the cord down and drive the cinch further into cinching or wedging position to lock the cord in place, and thus lock the item or load at basically that selected intermediate height between fully raised and fully lowered. This can facilitate easy, efficient, one-handed raising and lowering of an item or load, including but not limited to a planter. But also, this can facilitate selective easy, efficient positioning of the item or load and any height between fully raised and fully lowered.

In another aspect of the invention, the unit is relatively compact and self-contained to protect internal working components and to be relatively unobtrusive and compact in size. It can include decorative and aesthetic features.

These and other objects, features, aspects, and advantages of the invention will become apparent with reference to the accompanying specification and claims.

III. BRIEF DESCRIPTION OF THE DRAWINGS

FIG. 1A is an assembled side elevation view of a unit indicated generally by reference number 10 according to one exemplary embodiment of the present invention, showing in dashed lines an attachment opening 30 at its top end for connection to an elevating structure such as eave, ceiling, or wall bracket, and showing at its lower end an aperture or opening 32 to which can be attached a item or load such as a planter.

Figure 1A:
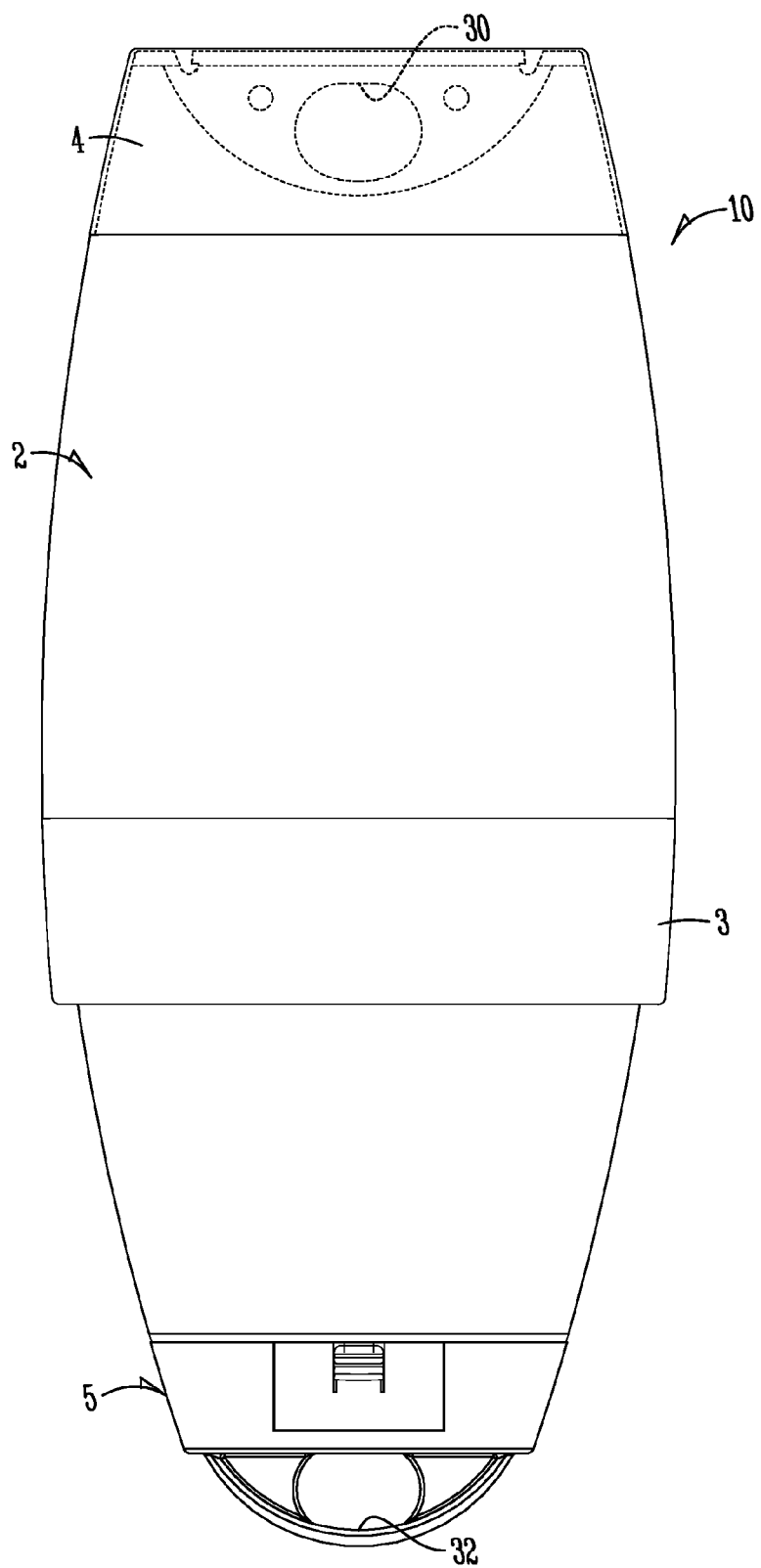
FIG. 1B is a reduced-in-scale side elevation view of the unit 10 of FIG. 1A attached at its top to a ceiling hook and suspending a planter 100 at its bottom in a raised position.
FIG. 1C is similar to FIG. 1B but shows the unit 10 of FIG. 1A holding planter 100 from the ceiling in a lowered position.
Figure 4:
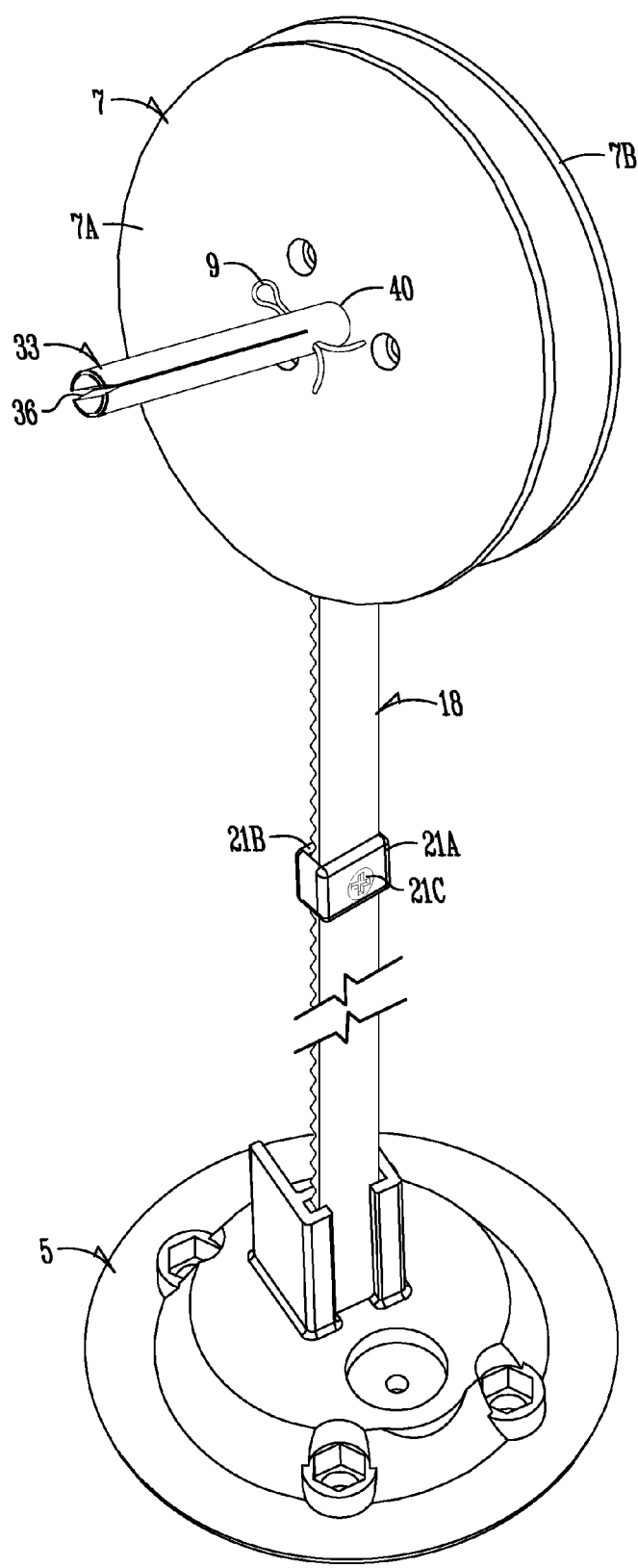

FIG. 4 is an enlarged isolated perspective view of an assembled spool 7 and push-up base assembly 5 used with the unit 10 of FIG. 1A, connected by elongated cord 18.

Figure 5:
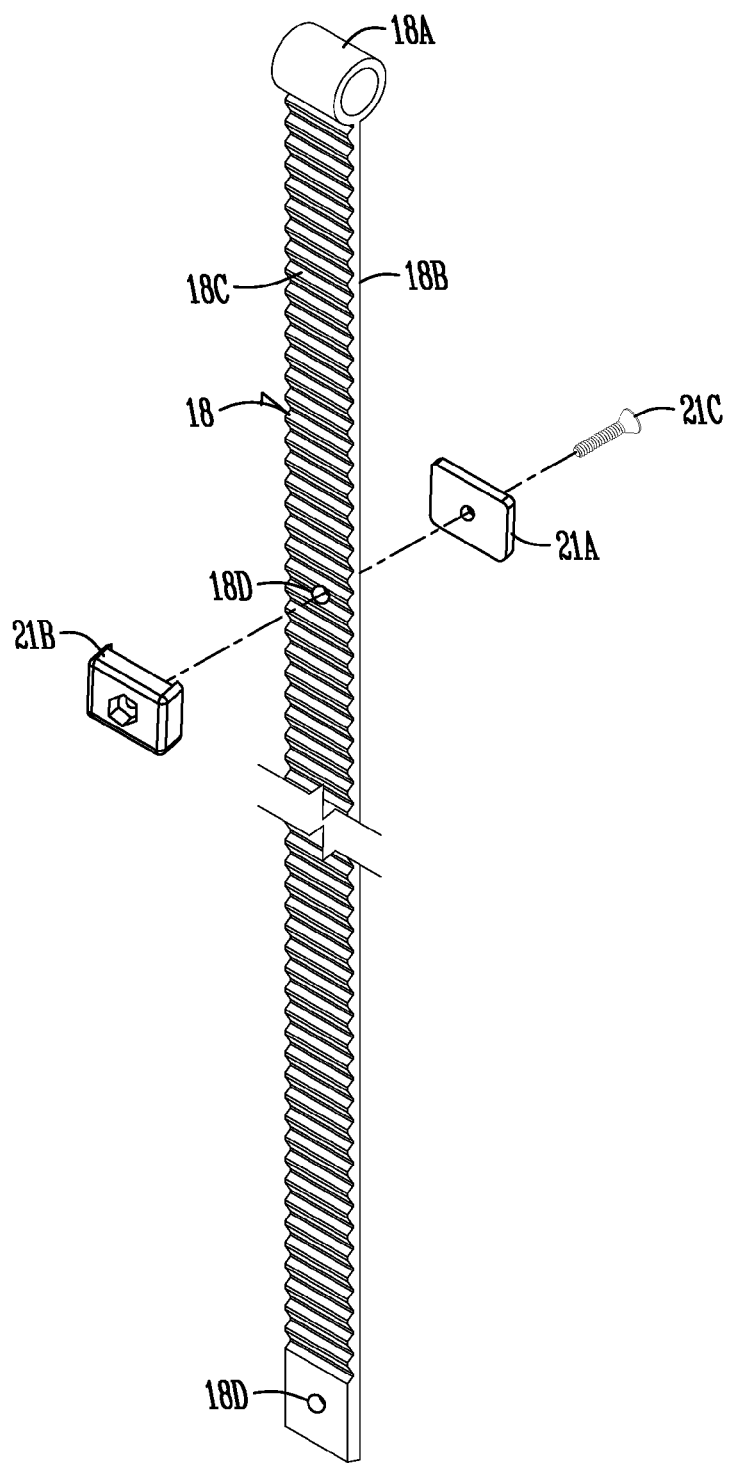

FIG. 5 is an isolated perspective view showing assembly of push-down piece 21 and its method of attachment to cord 18.

Figure 6:
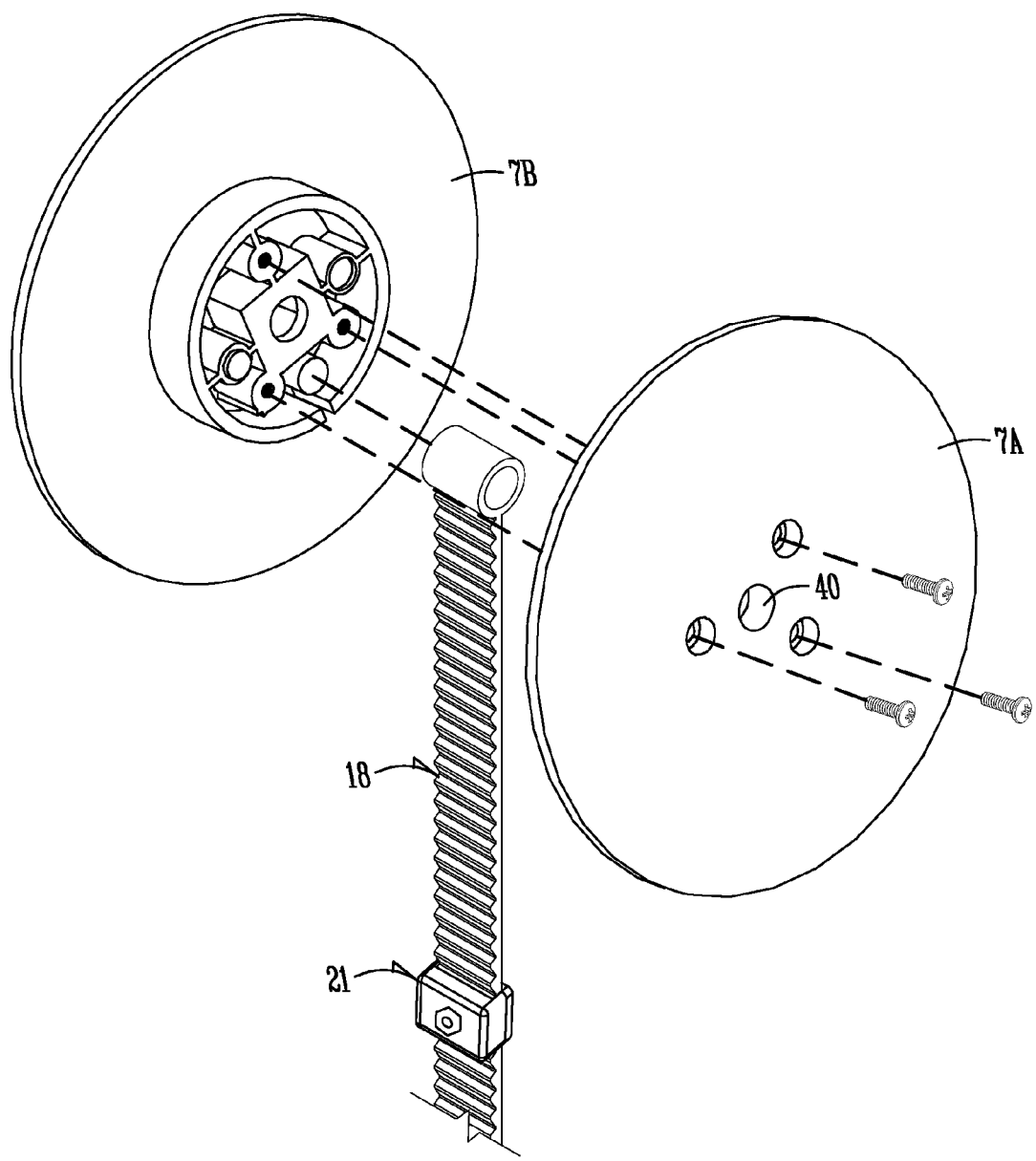

FIG. 6 is an exploded view of cord 18 relative to its spool assembly 7.

Figure 7:
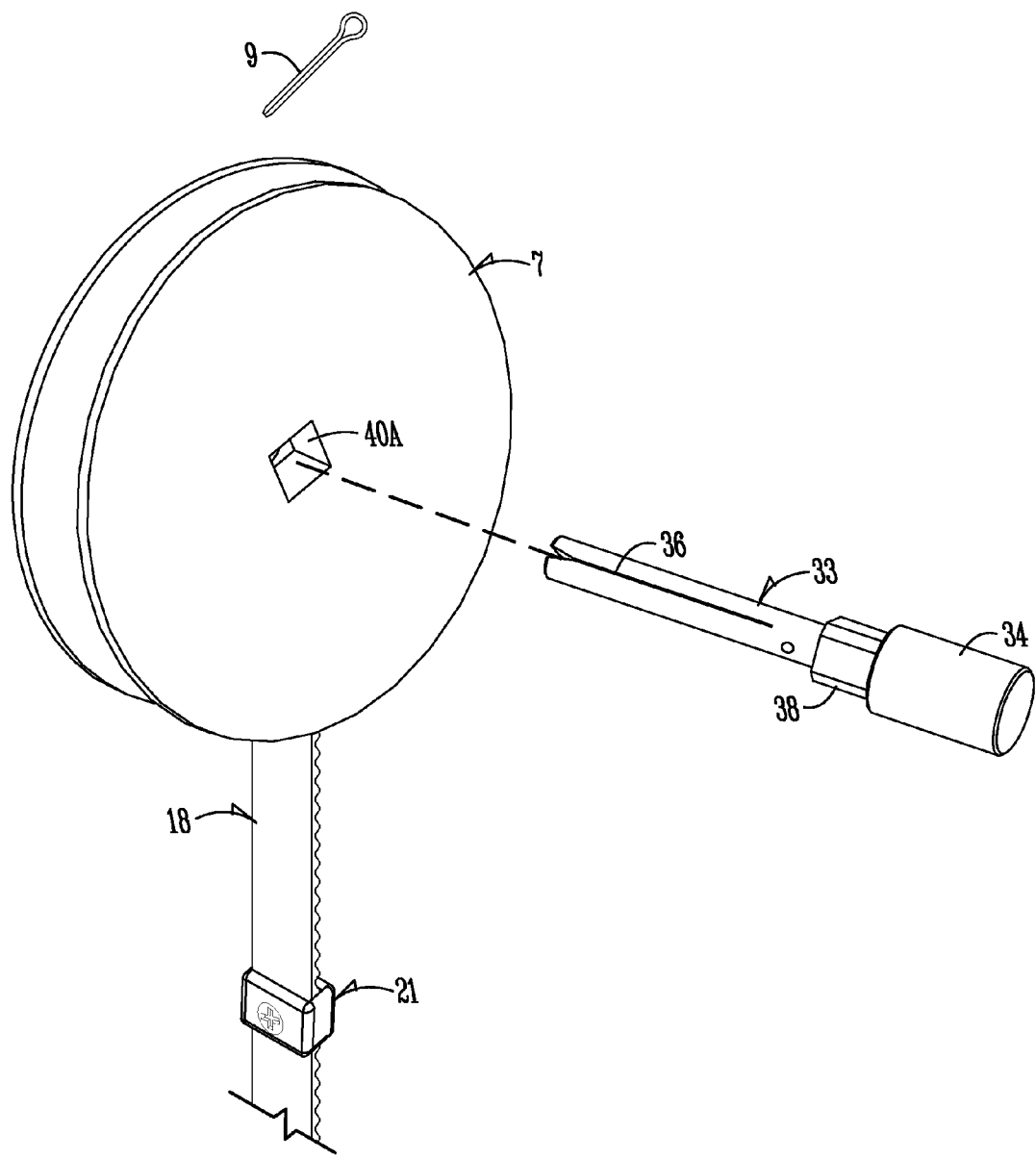

FIG. 7 is an assembled view of spool assembly 7 and cord 18, and showing in exploded fashion spool pin 33 that connects to a constant force spring 6 of a spring motor operably connected to spool 7.

FIGS. 8A-E are different isometric views of a first half 7B of spool 7.

Figure 9A:
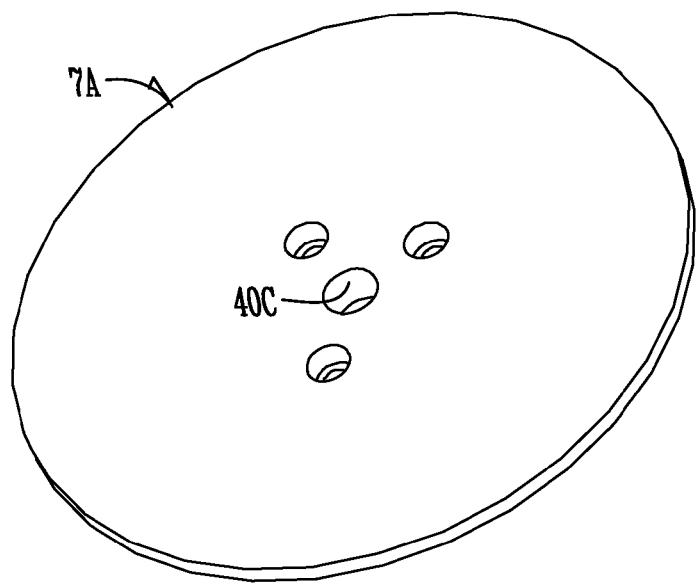
Figure 9B:
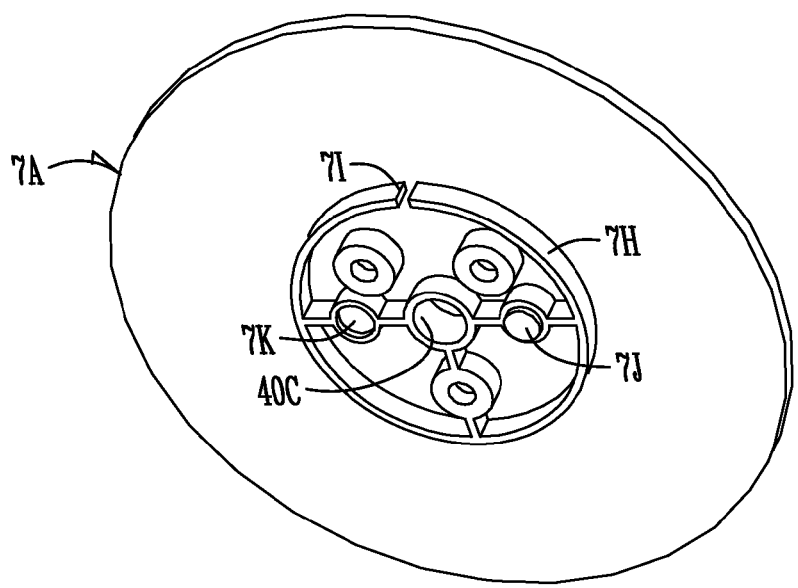
Figure 10D:
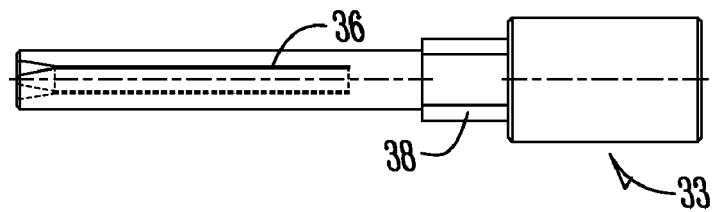
Figure 10E:
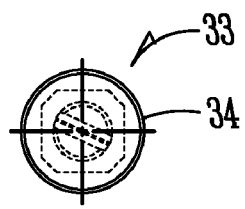
Figure 10F:
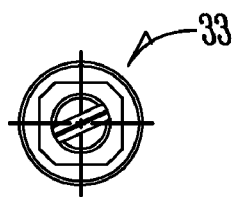
Figure 10G:
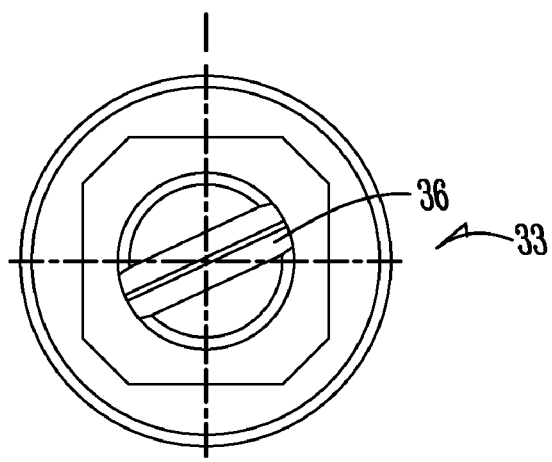

FIGS. 9A and B are different isometric views of the opposite half 7A of spool 7.

FIGS. 10A-G are different isometric views of the spool pin 33.

Figure 11:
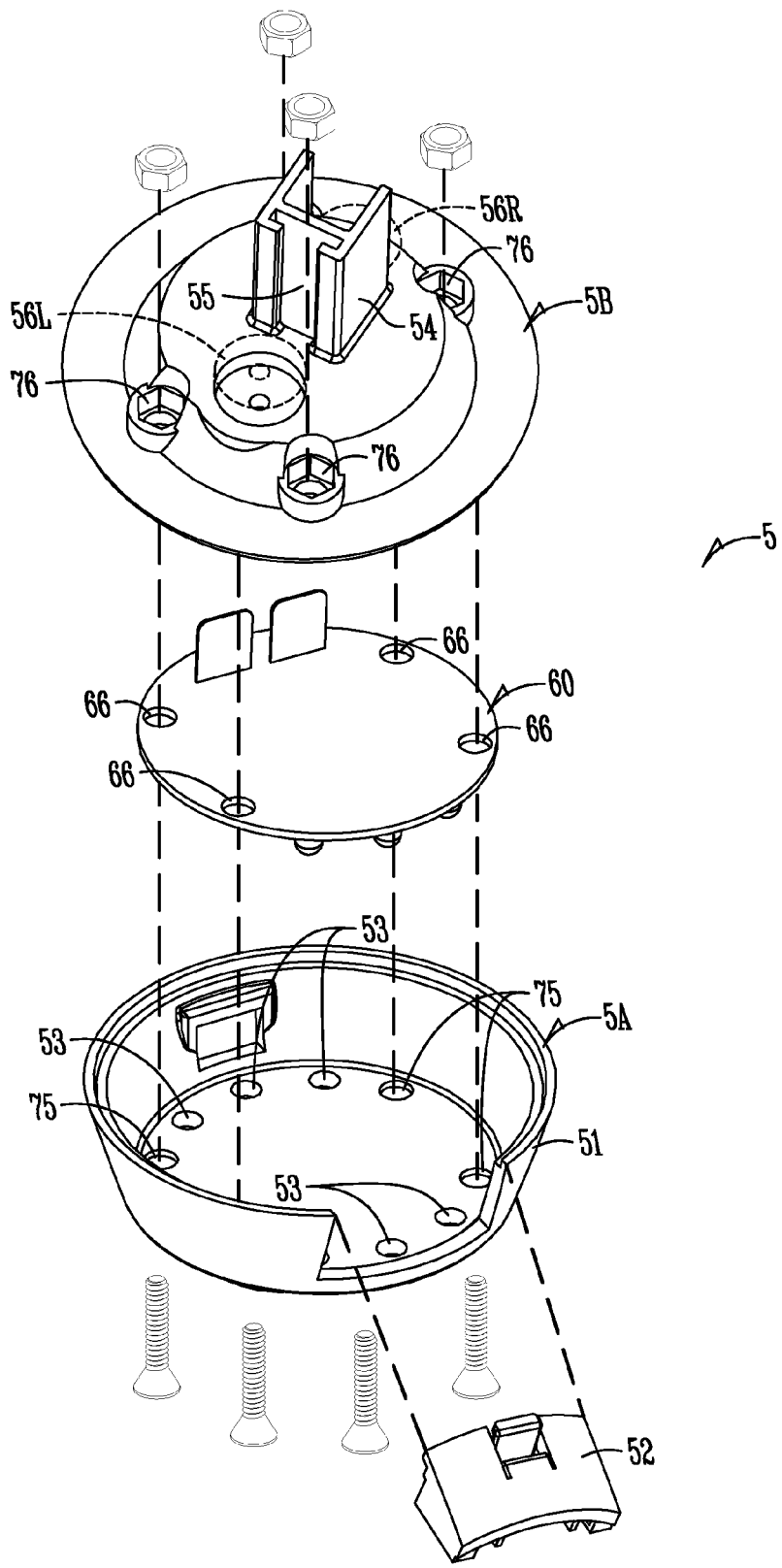
Figure 12A:
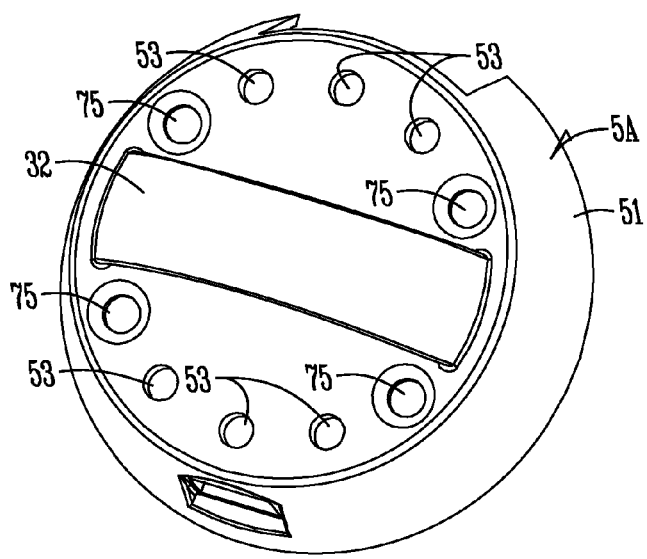
Figure 12B:
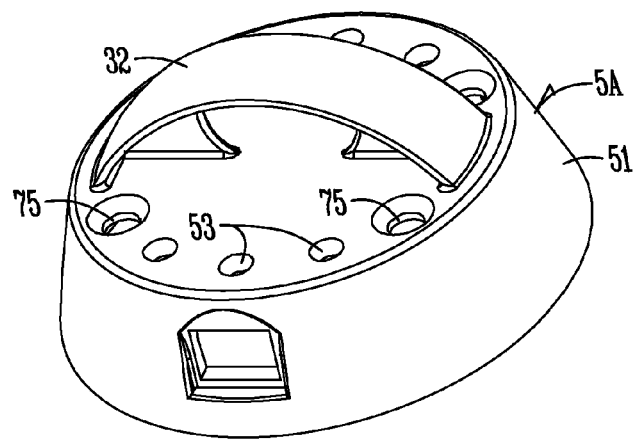
Figure 12C:
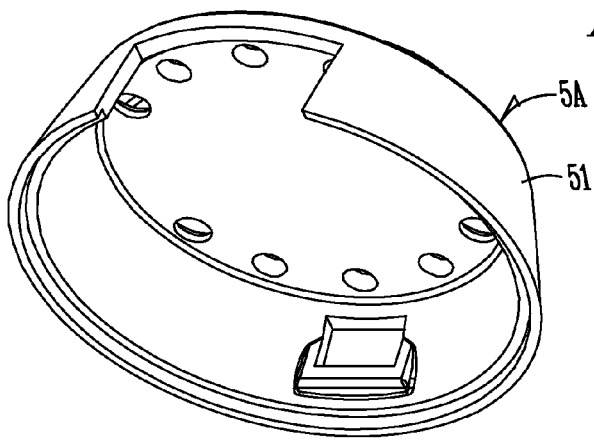
Figure 12D:
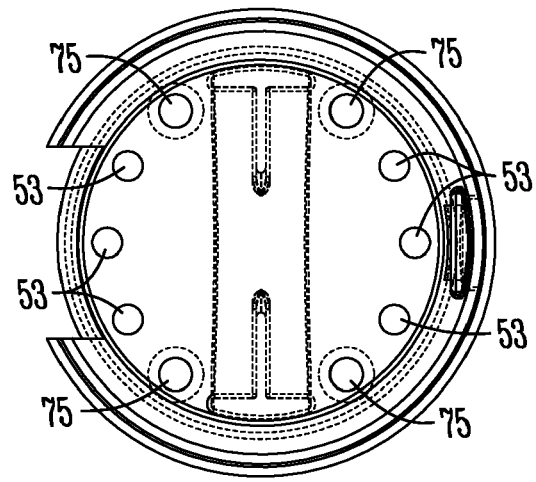
Figure 12E:
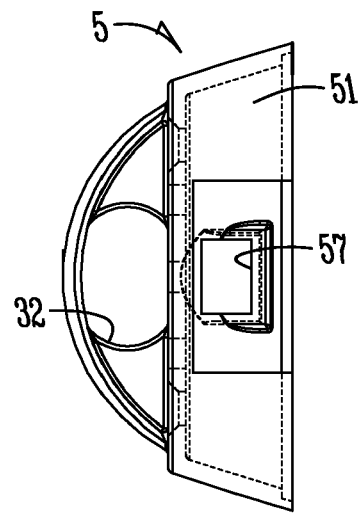
Figure 12F:
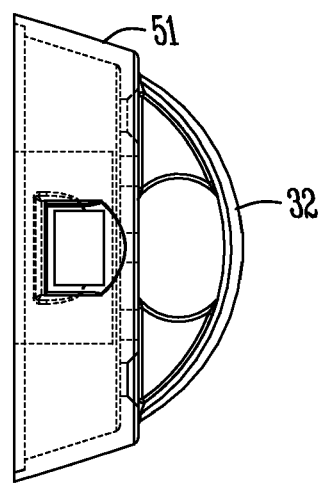
Figure 12G:
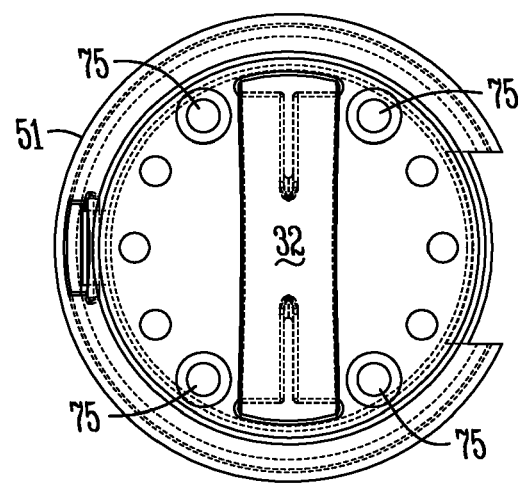

FIG. 11 is an exploded view of top 5A and bottom 5B of base 5 of apparatus 10, along with an optional LED printed circuit board or PCB 60 that can be installed in base 5.

FIGS. 12A-G are isometric views of outer housing 51 of bottom 5B of FIG. 11.

Figure 13A:
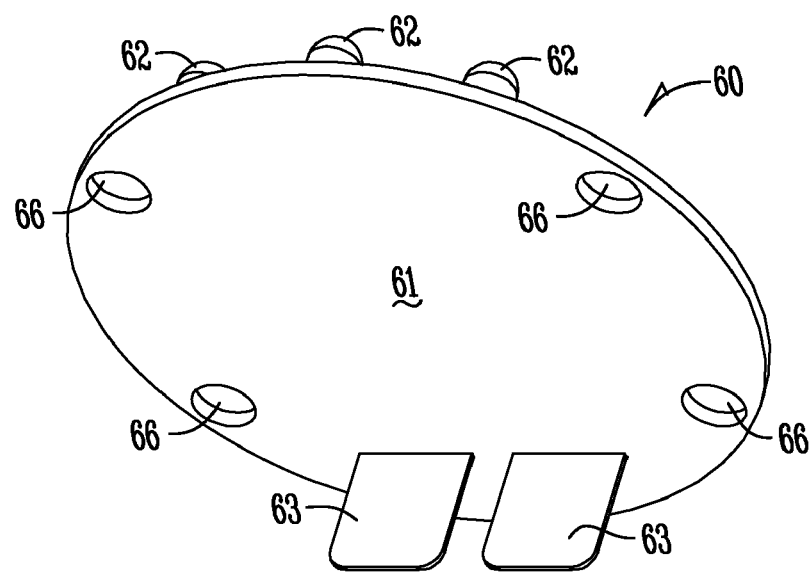

FIGS. 13A and B are isometric views of an LED array of the LED PCB 60 of FIG. 11 that can be operably positioned in base 5 of FIGS. 12A-G.

FIGS. 14A-D are isometric views of a top 5A of FIG. 11 that includes a connection for the distal end of cord 18, a push-up member or finger 76 that extends up into the interior of apparatus 10 when base 5 is in a raised position, and a battery compartment for batteries for the optional LEDs of FIGS. 13A and B.

Figure 15A:
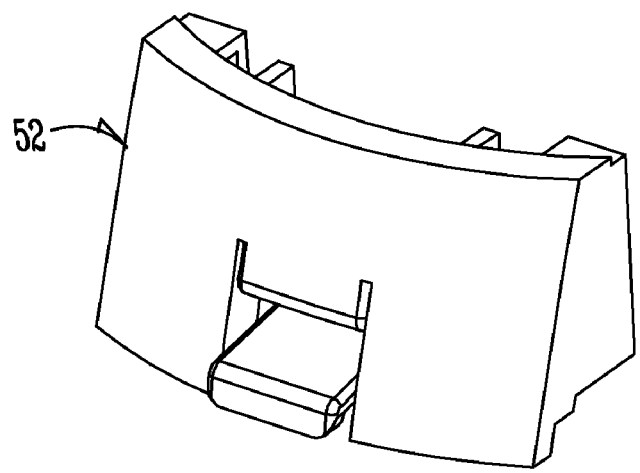
Figure 15B:
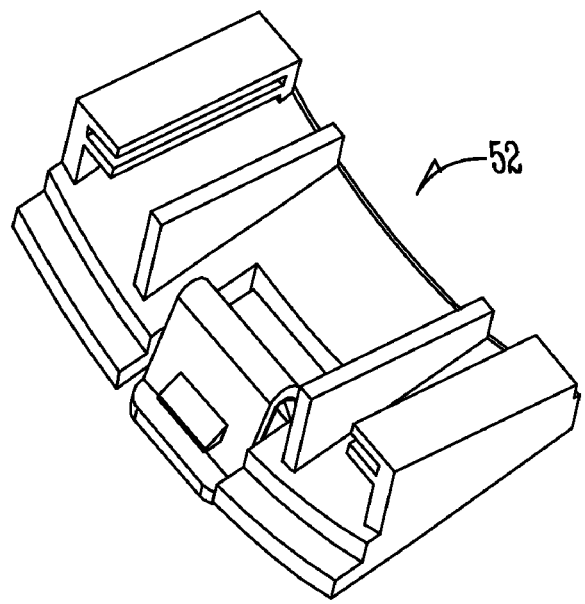

FIGS. 15A and B are isometric views of a removable access lid to the interior of base 5 of FIGS. 12A-G for access to and changeover of batteries.

Figure 16:
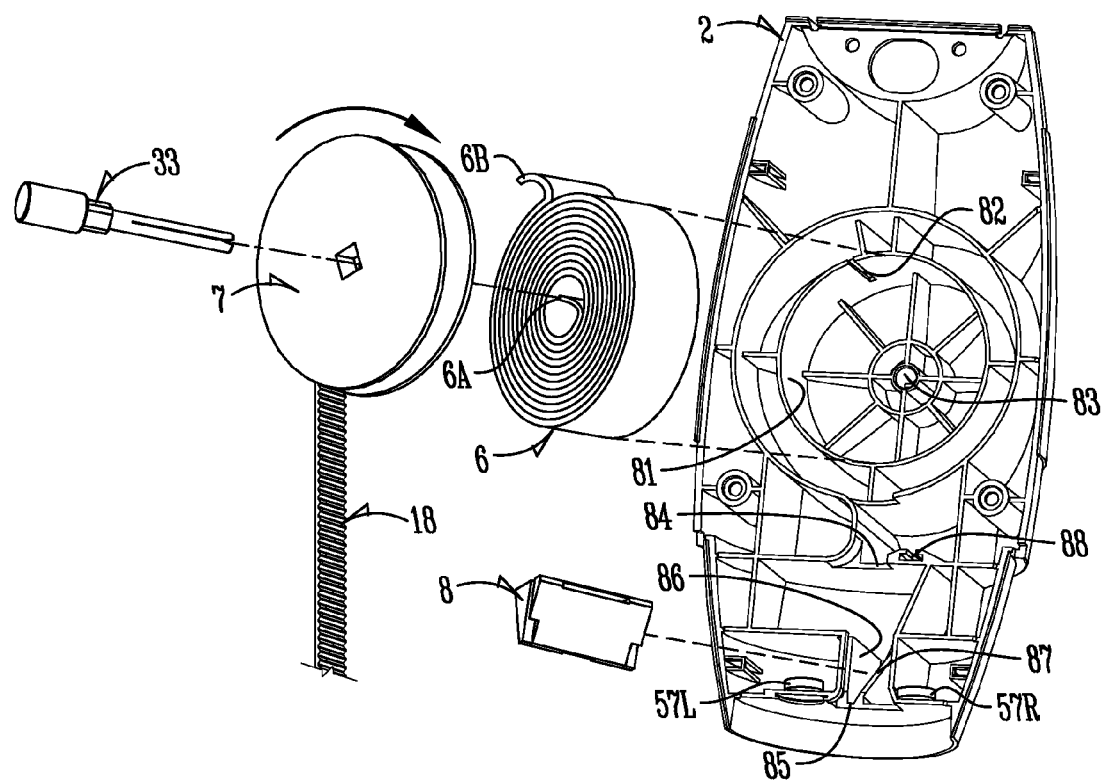

FIG. 16 is a perspective view of one-half 2 of the main housing of device 10 showing in exploded view constant force spring 6, spool 7, and a cinch member 8 to assist in illustrating assembly of device 10.

Figure 17:
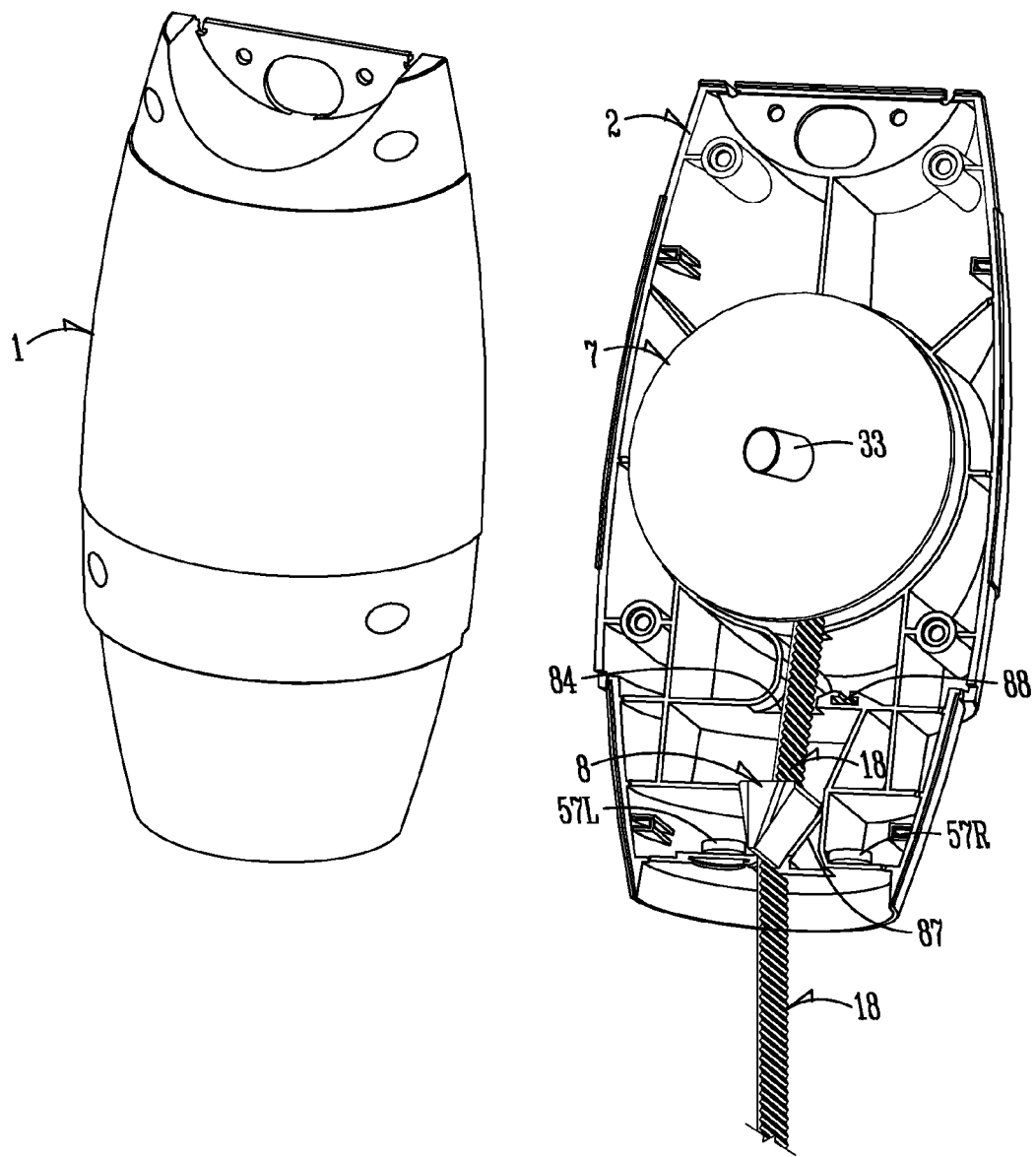

FIG. 17 shows spring 6, spool 7, and cinch 8 installed in housing half 2 and in exploded form the other half 1 of the housing of apparatus 10.

Figure 18:
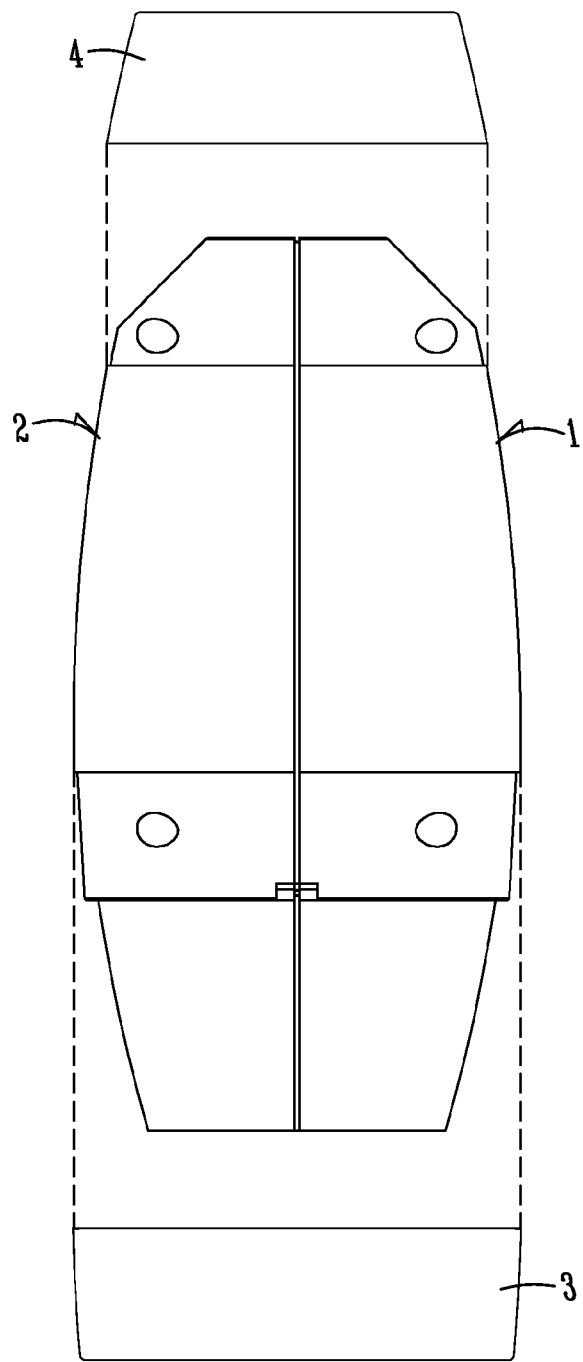

FIG. 18 is a perspective view of the two housing halves 1 and 2 assembled with finishing decorative rings 3 and 4 in exploded view.

Figure 19C:
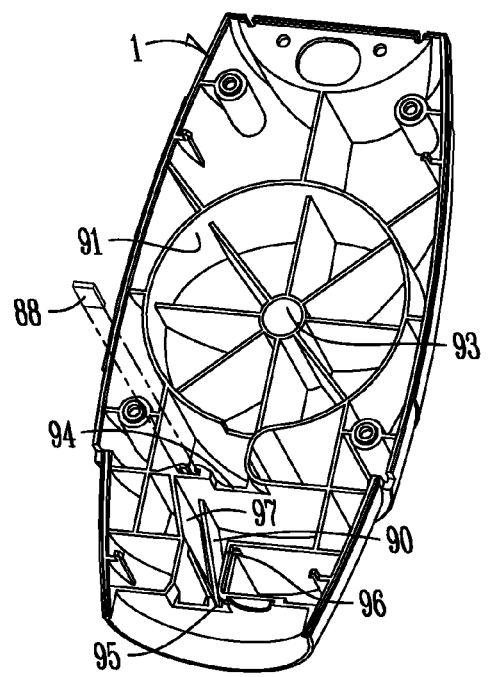
Figure 19C:
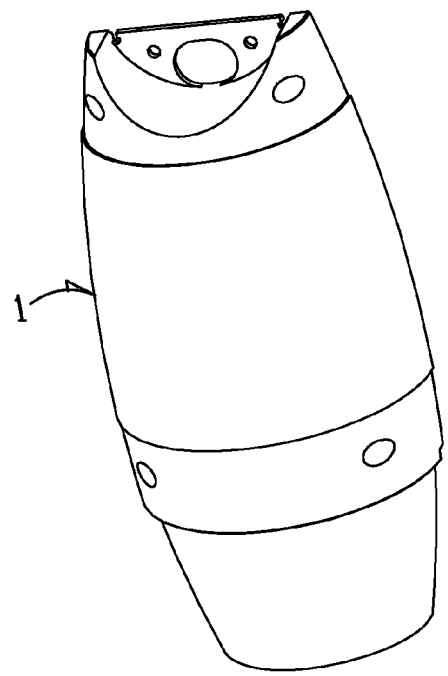
Figure 19C:
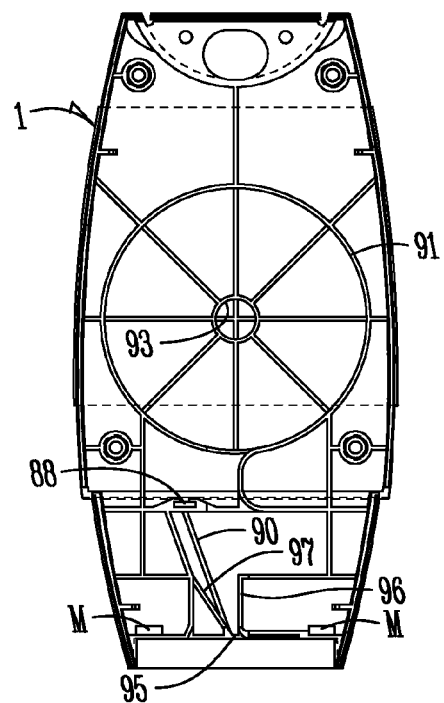

FIGS. 19A-C are isometric views of housing half 1 of FIG. 17.

FIGS. 20A-C are isometric views of housing half 2 of FIG. 17.

Figure 21A:
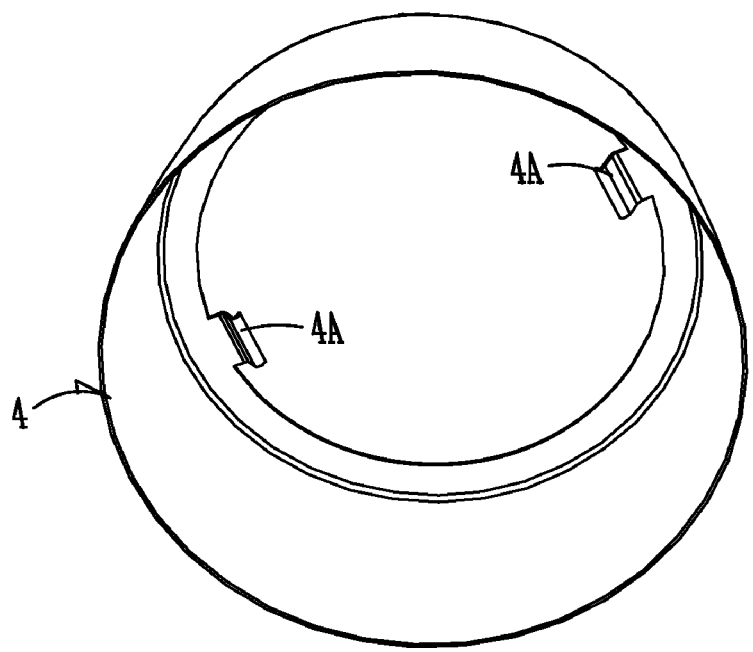
Figure 21B:
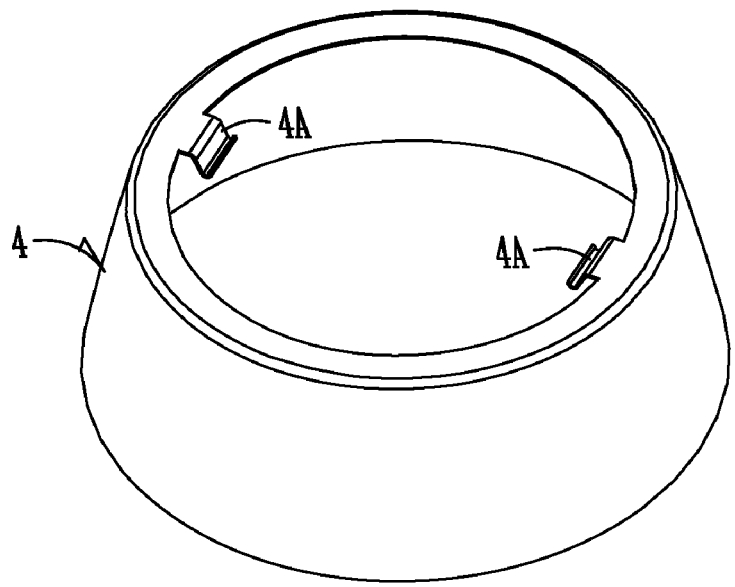

FIGS. 21A and B are isometric views of the top ring 4 of FIG. 18.

Figure 22A:
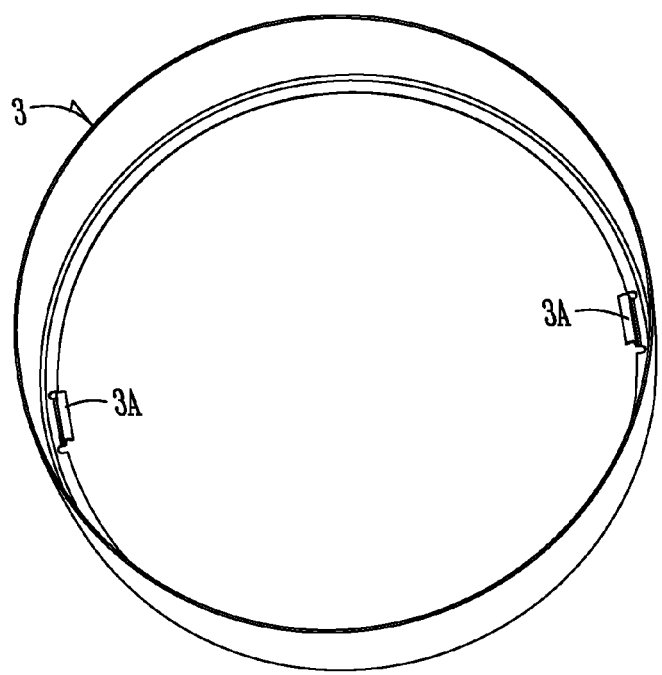
Figure 22B:
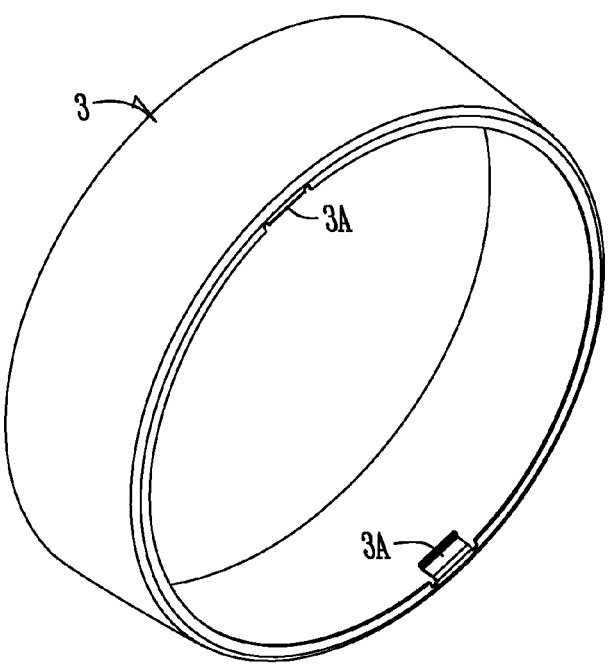

FIGS. 22A and B are isometric views of lower ring 3 of FIG. 18.

Figure 23:
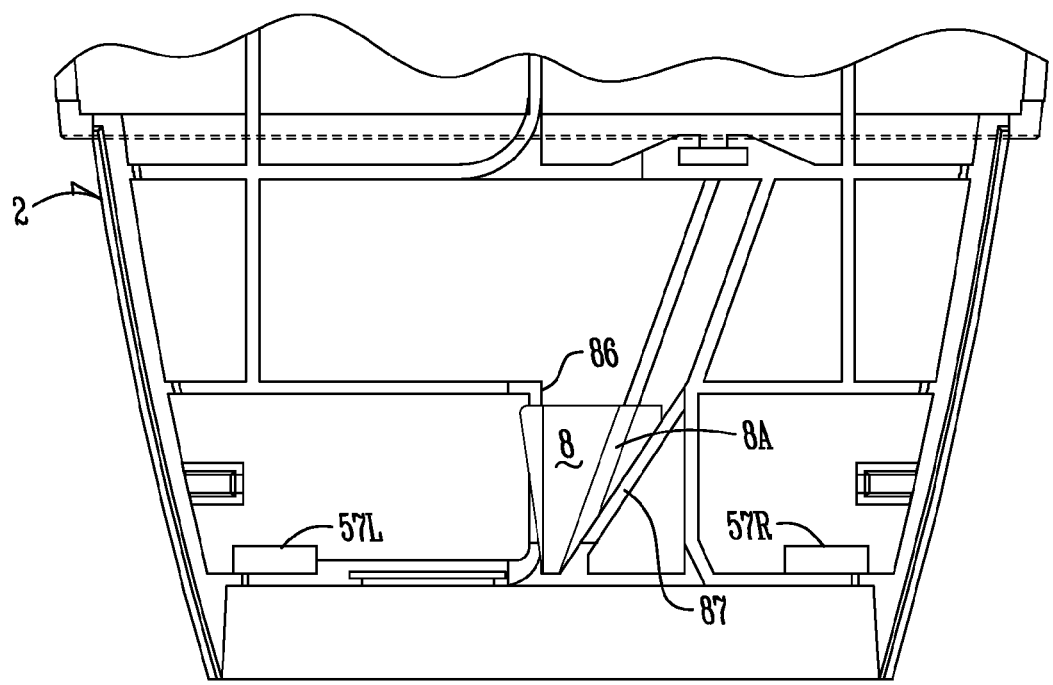

FIG. 23 is a partial interior view of the lower part of housing 2 showing the position of cinch member 8 in a cord-locking or lowered position.

FIGS. 24A-G are isometric views of cinch member 8.

Figure 25:
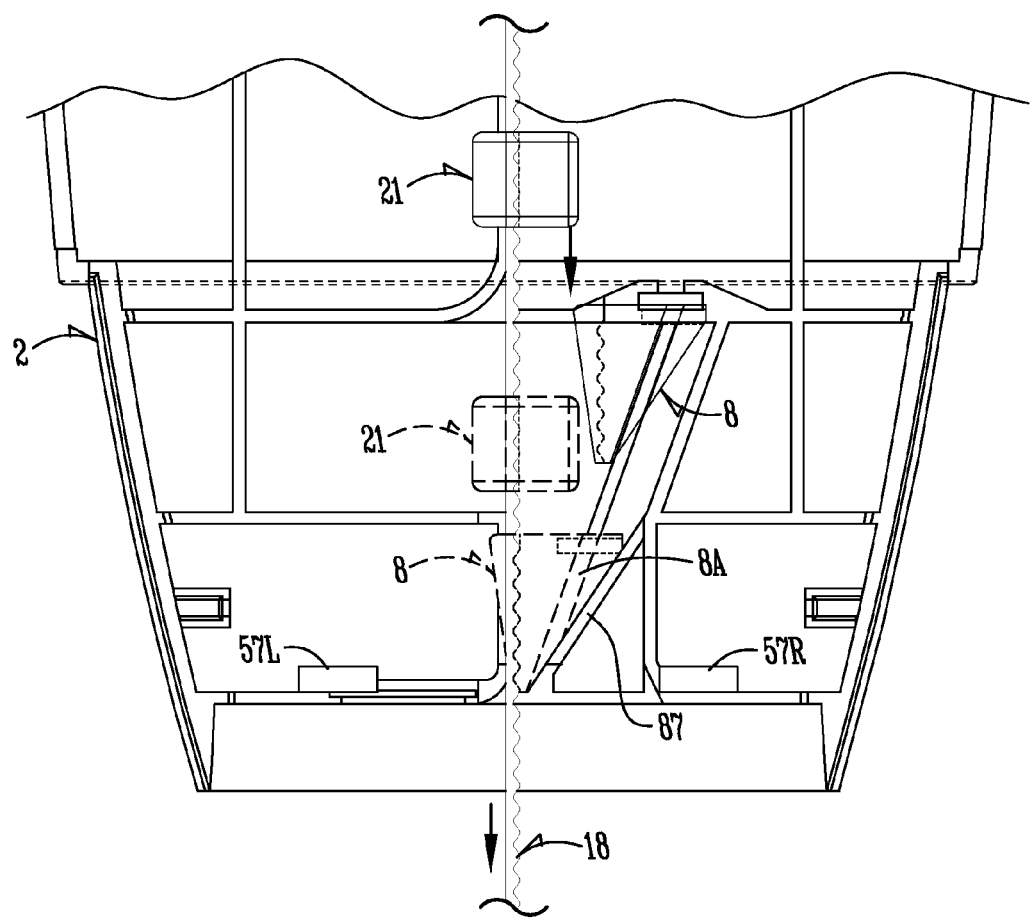

FIG. 25 is similar to FIG. 23 but how push-down member 21 on cord 18 can knock cinch 8 from a magnetically stored position towards a cinching position relative to cord 18.

Figure 26A:
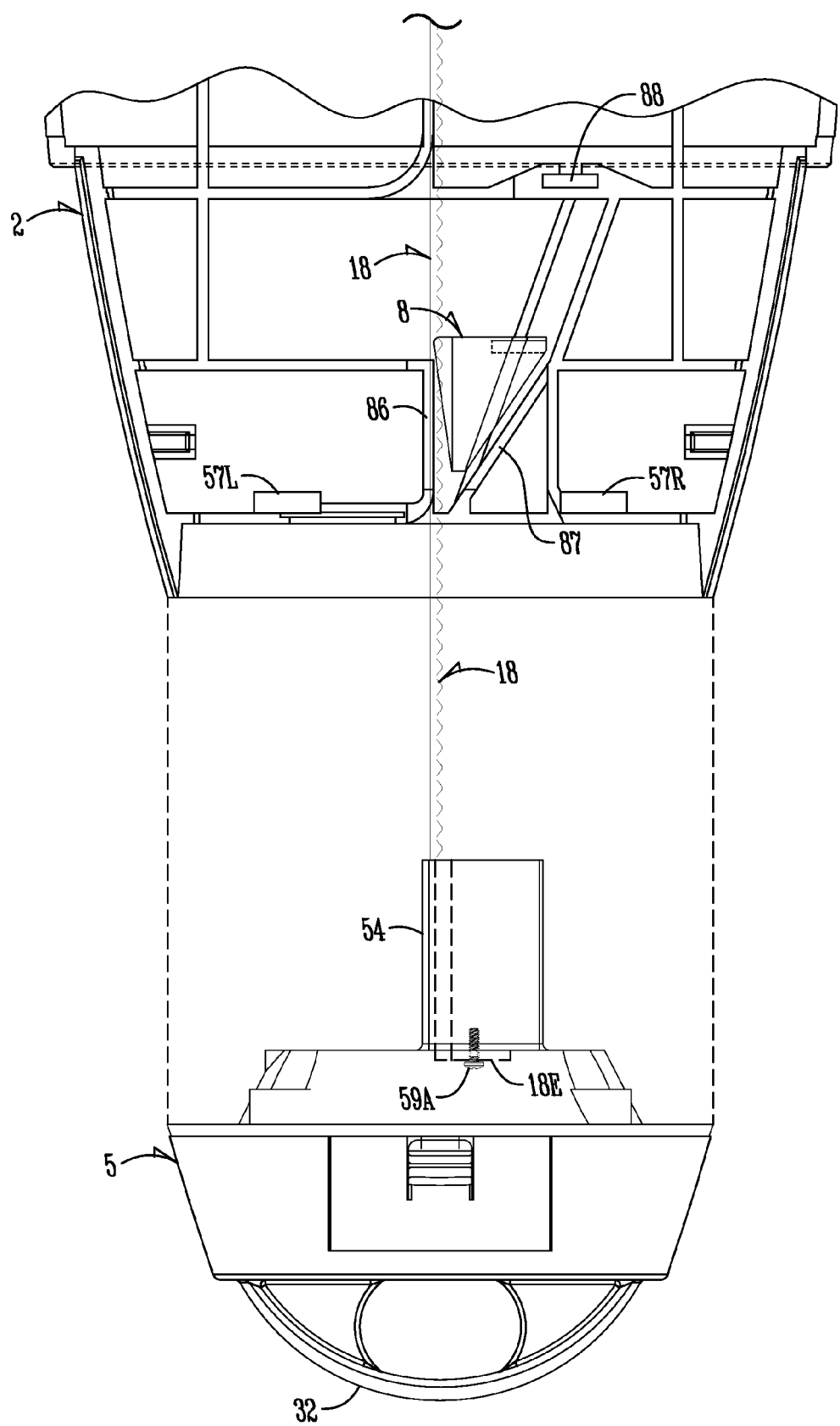

FIG. 26A is similar to FIG. 25 but shows cinch 8 in a cinching position.

Figure 26B:
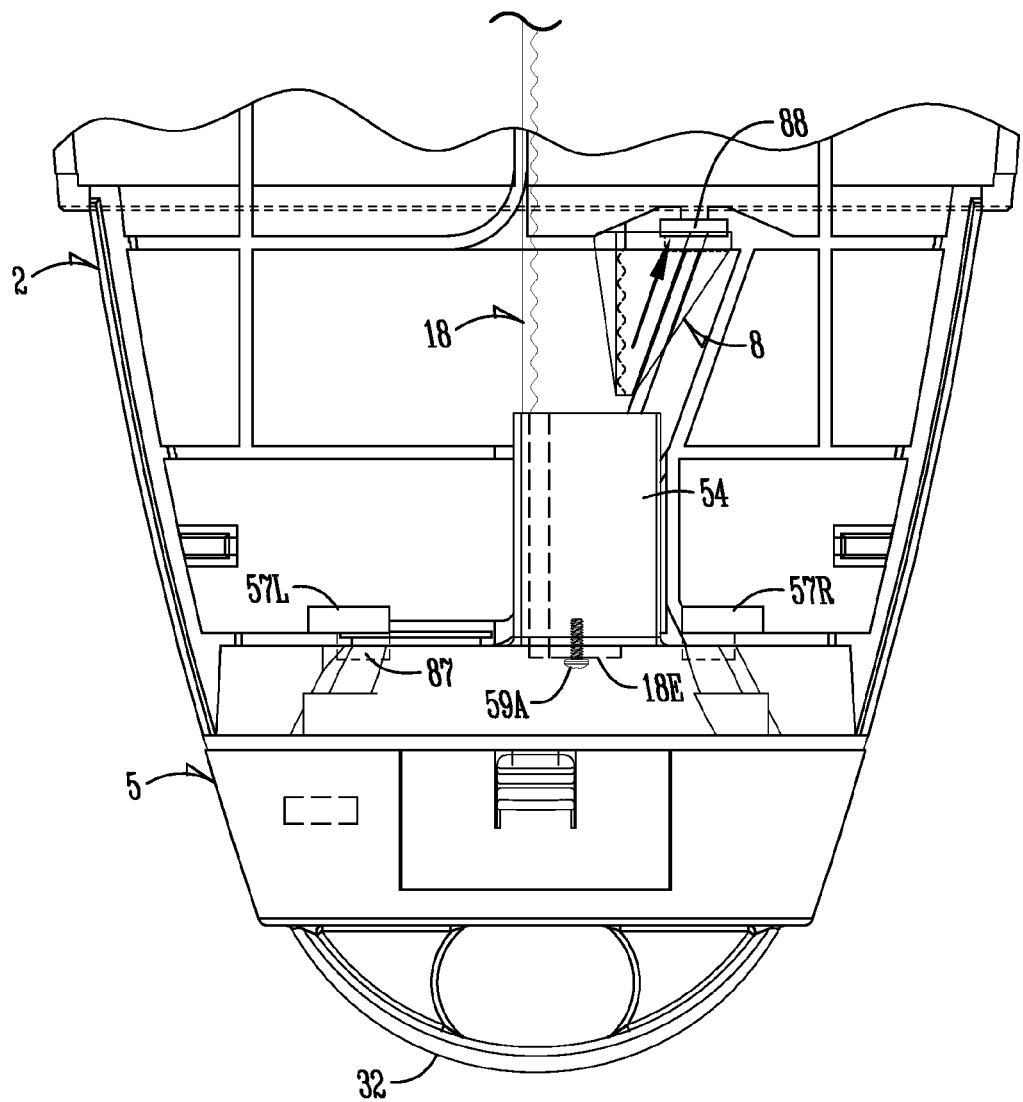

FIG. 26B is similar to FIG. 26A but shows how movement of push-up member or finger 54 of base 5 upwardly into the main portion of unit 10 pushes cinch member 8 out of cinching position and into a magnetically stored position.

Figure 27:
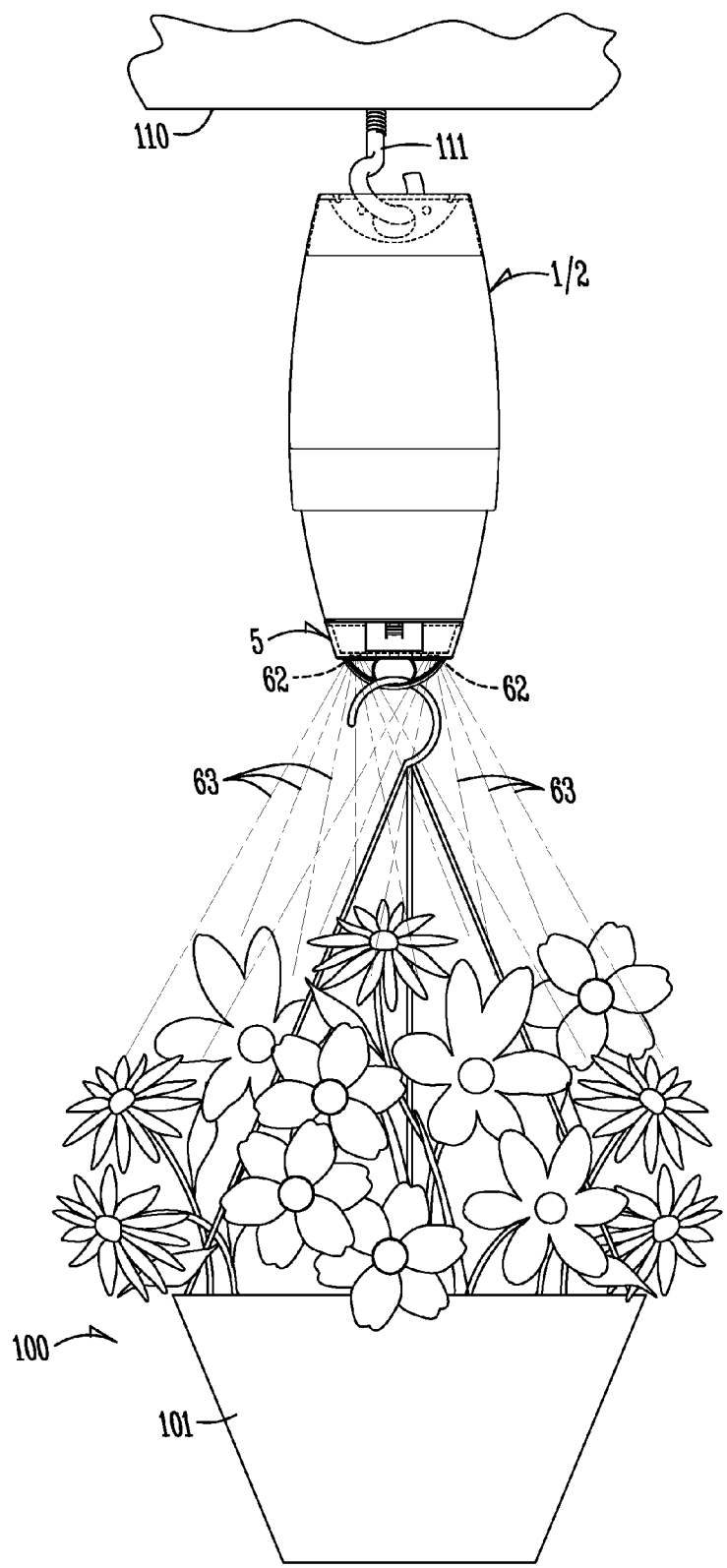

FIG. 27 illustrates illuminate of the planter by the optional LED PCB 60, if installed and operated in base 5.

IV. DETAILED DESCRIPTION OF AN EXEMPLARY EMBODIMENT

For a better understanding of the invention, a detailed description of one form it can take will now be set forth. Frequent reference will be taken to the figures which accompany this description. Reference numerals will be used to indicate certain parts and locations throughout the figures. The same reference numerals will indicate the same parts and locations unless otherwise indicated.

The context of the exemplary embodiment is a unit that allows selectable lowering and then raising of a planter from an elevated support such as a wall bracket, awning, ceiling, eave, etc., where the planter and its contents are in the range of 8-12 lbs. However, as will be appreciated, the invention can be applied to hanging and then raising and lowering a wide variety of other items or loads that could be attached to the bottom of the unit and which is of a mass or weight that is compatible with the components of the unit. Examples include but are not limited to, bird feeders, banners, signs, displays, ornaments, targets, baskets, lights, and the like.

Additionally, the unit and its components can be scaled up or down in size and/or ability to support and operate with different planters, items, or loads.

A. Specific Exemplary Embodiment

1. General Function and Features of Exemplary Unit 10

In a first exemplary embodiment, one intended purpose of the unit is to allow the user to hang a planter with soil and plant(s) from an awning, ceiling, or other elevated supporting structure indoors or outdoors. In this example, the weight range of the combined planter, soil, and plant(s) is between approximately 8-12 lbs. At any time, for any reason, it would be able to be pulled down. Reasons include but are not limited to, performance of maintenance on the plant(s) (e.g., watering), soil (e.g. amendments, fertilization, etc.), or planter (cleaning, adjusting, etc.) as needed Afterwards, a person would be able to push, with ease, the planter back up to a more elevated position and the unit automatically facilitates the same.

One feature is that while pushing it back up from its fully lowered position, it can be locked into any position along that range. In the exemplary embodiment, this feature is accomplished through a translatable cinch piece relative to a suspending cord. A constant force spring, clock spiral spring, or other biasing component that functions as a spring motor automatically retracts the cord when raising the planter or other item or load so that the user can simply control the height of the planter by raising the planter. In this embodiment, the length of the cord allows lowering of the planter approximately 3.5 feet and then fixing of the planter at any height between or including fully lowered and fully raised positions, again without any manual action except raising and lowering the planter. Thus, in many cases after initial hanging of the unit and the planter or other item or load suspended from it, a user can lower and selectively raise and fix in position along that range the planter or other item or load by him/herself, sometimes with just one hand. And raising and lowering can be repeated for a relatively large number of times without any replacement or maintenance of the unit.

One feature of the exemplary embodiment is as follows. The characteristics of the components are intentionally designed to be used with planters or other items or loads of a specific range of weights. While this is not necessarily required, doing so assists in ease and efficiency of operation.

In this example, the planter to be suspended is intended to be between 8-12 pounds in weight. The biasing component that provides winding force for the cord is selected to provide approximately 8 pounds of constant winding force on a spool for the cord. When the planter is connected to the cord, this biasing component (e.g. constant force spring) by itself substantially suspends the planter. Thus, only minimal downward pulling force by the user on the planter overcomes the 8 pounds of winding force and allows smooth, controlled lowering of the planter, many times by even one hand. But further, if the user desires to move the planter up, the user only has to push up slightly on the planter to the point enough of the weight of the planter is released from the cord that the 8 pounds of winding force winds the cord back up on the spool. Similarly, this allows easy, many times one-handed control of the planter to move it back up.

Furthermore, other components in the exemplary embodiment assist in easy of operation. In this example, magnets of sufficient attraction force are placed so that when the base is moved to a fully raised position (at the lower end of the main portion of the unit), the magnetic attraction force is sufficient, with any winding force by the biasing component, to hold the base and the planter in that fully raised position. There is no requirement for any lock, cinch, or other mechanism to do so, nor does the user have to provide any lifting force. In this example, this is accomplished by a pair of magnets rated at 6 pounds at spaced apart positions on the bottom of the main portion of the unit, and a pair of same 6 pound rating at the same spacing on the top of the base. The designer can select the appropriate number, position, and strength(s) of magnets to hold the base and planter up but also allow fairly minimal downward pulling force on the planter to separate the base. In this example, the components are selected to require only a few pounds of downward pulling on the planter by a user to do so. The weight of the planter, between 8 and 12 pounds, provides a substantial amount of force to start with, which then means the user has to add just enough to separate the magnets. This also provides for easy, efficient, and controlled release of the planter from its fully raised position.

As can be appreciated from the foregoing, as well as further description below, if there is no load on the base (as with an 8-12 pound planter), it would be substantially more difficult to separate the base from its magnetic attraction to the main portion of the unit. Likewise, if there were no load on the base, it would be substantially more difficult to unwind the cord. Both would be possible if needed. But in normal operation of the exemplary embodiment, a subtle feature is that by such selection of components, the weight of the planter, or any other item or load, is utilized in the ease and efficiency of operation of the unit, including the ability fix the planter in a fully raised position, release it from fully raised, lower it, and raise it.

As can be further appreciated, items or loads above approximately 12 pounds weight are not indicated for use with the exemplary embodiment. But modifications could, of course be made to it to accommodate heavier items or loads utilizing the concepts described above. Items or loads less than approximately 8 pounds could be used with the exemplary embodiment, but would likely require more user control (e.g. more user pulling force to release the base, more user control of the planter to prevent it from moving too quickly upward, etc.). Alternatively, the components of the unit could be modified (e.g. a constant force spring of lower force, magnets of lower force, etc.) to provide functionality utilizing the general concepts of the exemplary embodiment.

2. Parts of Unit 10

The exemplary embodiment is shown in isolation in FIG. 1A. The assembly will be referred to generally by as unit 10. Unit 10, in this embodiment, is approximately 9.6 inches from top to bottom and approximately 4.5 inches in diameter. It is roughly cylindrical in shape. Its exterior is roughly like a football in size and shape. Unit 10 has a main portion enclosed by two essentially minor image halves 1 and 2 (colored plastic with exterior textured surface) that can be automatically aligned by molded-in alignment structures (e.g. pins and sockets, tabs and slots, etc.) and fixed together by fasteners such as screws, bolts, etc.). A base 5 (plastic colored and textured like halves 1 and 2) can be mateably abuttable to the lower end of assembled halves 1/2. Exterior ornamentation can be added, in this example in the form of two decorative rings (e.g. copper plated metal, plastic, or composite material). Parts 1, 2, and 5 enclose internal components that facilitate the function and features of unit 10 discussed above.

As will be described in more detail later, the internal components include an elongated cord 18 (rubber/nylon, ribbed on one side, rectangular in cross section and approximately 3.5 feet long) connected at one end to spool 7 that is operably and rotatably connected via a split arbor to a backwindable pre-stressed spring motor. An opposite end of cord is fixed to the base 5. The base can be separated from the main portion of unit 10 (the portion basically encased by housing halves 1 and 2). A cinching mechanism or cinch 8 is translatable between a stored non-cinching position and a cinching position to facilitate clamping of cord 18 against a clamping surface in housing halves 1 and 2 to allow a user to fix how much of cord 18, if any, extends outside halves 1 and 2; which allows the user to select which height to fix the planter or other item or load, over a range of heights when unit 10 is suspended from the ceiling or other elevated supporting structure. The configuration of components and interior structures allows other operational features of unit 10, such as will be discussed later.

The through-hole or opening 30 in unit 10 is robust enough to support unit 10 and a planter or other item or load of total 8-12 lbs by a hook, bracket arm, rope, wire or the like which, in turn, is suspended from a supporting structure such as a ceiling, awning, or eave, or from a bracket arm extending from any of the foregoing or from a vertical side wall. Assembled unit 10 can be placed almost wherever desired and hang down from its connection 30. In one example, such as indicated at FIGS. 1B and 1C, a user can climb a ladder and mount unit 10 from, for example, a porch ceiling 110 that is too high to reach standing on the porch floor.

The base 5 at the lower end of device 10 also has an attachment member or structure 32, in this case a through-hole or opening formed in an inverted handle-like member. The opening transversely through that upside-down handle-like member 32 is sized to receive any of a range of things like a hook, claw, or other structure from which wires or ropes 101 can be attached and extend down from to suspend a hanging planter assembly 100. As shown in FIGS. 1B and 1C, planter assembly 100 includes a planter or flower pot 102 containing soil and flowers. Wires 100 are attached at spaced apart positions around the upper rim of pot 102 and converge to hook 103. The open end of hook 103 can be removably inserted through the opening in lower attachment member 32 or unit 10.

Figure 2:
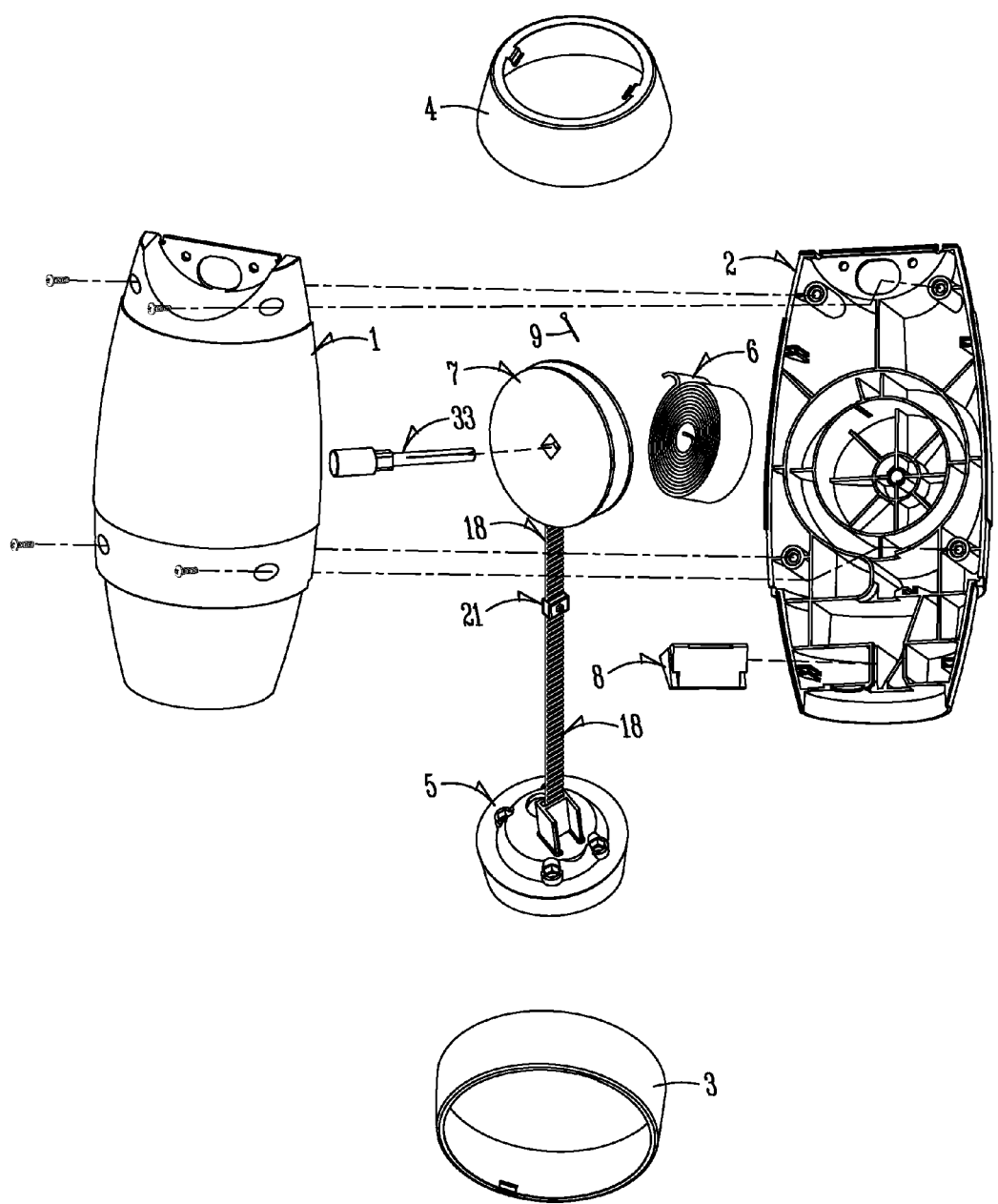
FIG. 2 is an exploded view of the exemplary embodiment 10 of FIG. 1A.

FIG. 2 shows the two piece casing or housing (see ref. nos. 1 and 2) that is held together by top and bottom covers 4 and 3 and screws between halves 1 and 2 (see also FIGS. 19A-C and 20A-B). Push-up piece or base 5 mates into the bottom of casing 1/2 to form a highly aesthetic, integrated device.

Figures 1B, 1C:
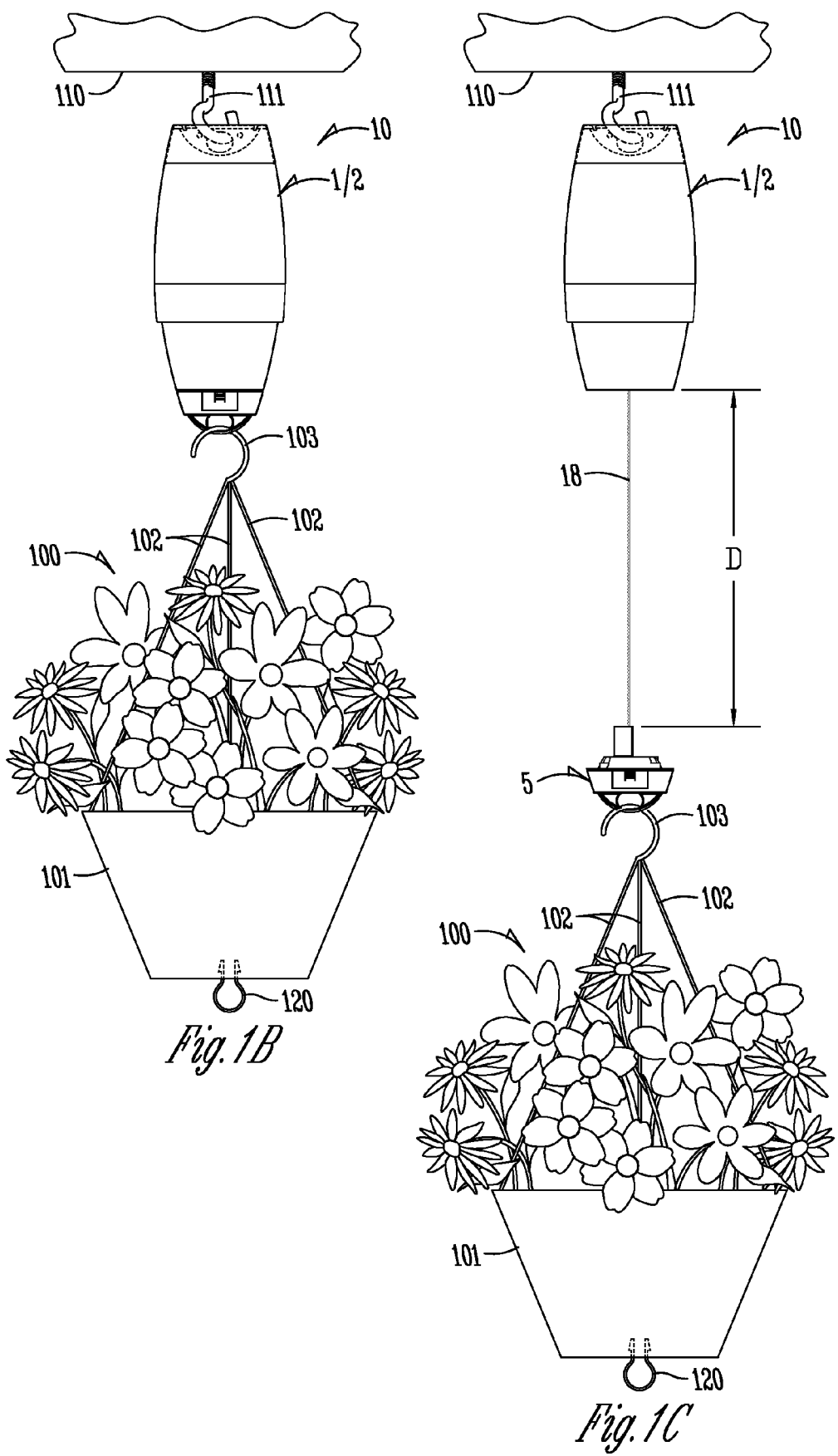

As indicated in FIGS. 1B and 1C, a cord 18, in this example over 3.5 feet long, can be automatically wound up for storage inside the interior of apparatus 10 when base 5 is in the fully raised position of FIG. 1B, but can be unwound and extended downwardly a distance D (FIG. 1C), in this example dictated by the length of cord 18 to extend approximately 3.5 feet away from the housing of 10.

Note that in this example, pot 102 is suspended by wires 102 and hook 103, which are approximately 1 foot from top to bottom. Thus, in the fully raised position, pot 102 would hang about two feet below ceiling 110 (because unit 10 is roughly 1 foot in height when hung from the ceiling and wires/hook 102/103 is approximately 1 foot in height when pot 101 is hung from unit 10). Cord 18 and base 5 are extendable approximately 3.5 feet from unit 10 when fully unwound, and therefore pot 101 can be brought to a fully lowered position approximately 5.5 feet below ceiling 110 (in the case of a 9 or 10 foot high ceiling 110, to from about 3.5 to 4.5 feet above the ground or floor), to allow such things as watering, maintenance, or checking on the flowers. Thus, if ceiling 110 is approximately 9 to 10 feet from the ground or floor, when in the raised position of FIG. 1B, pot 101 would be approximately 7 to 8 feet off the ground or floor. This would allow most people to reach pot 101 in its raised position of FIG. 1B without a ladder, step-stool, or similar assistance. But usually no more than a step-stool would be necessary. And when fully lowered, pot 101 would be at or near torso level for most people, making it easy to reach and see the contents of pot 101 and work on the same.

As mentioned above, interior components of apparatus 10 allow the release of pot 101 from its raised position and a controlled lowering while attached to base 5 and extendible cord 18 to its fully lowered approximately 3.5 feet extension from the main housing (halves 1 and 2) of unit 10. And, as will be explained below, apparatus 10 can also automatically cinch cord 18 in any extended length between and including fully extended and fully retracted as chosen by the user.

Therefore, unit 10 allows a user to raise or lower a planter, or for that matter, any item that is within certain general weight and size parameters, to fully raised or lowered positions, simply by grabbing the suspended item (like pot 101) and moving it relative to housing 1/2 to release at least some of the down force on cord 18 by gravitational pull of pot 101. There is no time spent tying or untying ropes. There is no reaching up to flip a lever or move any piece on unit 10. The raising and lowering can literally be accomplished solely by moving pot 101 or whatever is suspended from base 5 and cord 18.

In this embodiment, unit 10 according to the exemplary embodiment of the invention can be on the order of a half a foot to a foot long and a quarter to a half a foot wide. It can be scaled up or down according to need or desire.

FIG. 2 shows the unit 10 in exploded form. Spool 7 is sized to hold cord 18 (see also FIGS. 4-7) that can be a band- or tape-like member that can extend approximately 3.5 feet (e.g. of rubber material like typical belts associated with automobile engines, e.g., fan belt, water pump belt, etc.). A constant force spring 6 (or clock spiral spring or other similar spring) is held in a keeper or cup in housing halves 1 and 2 and operatively connected to a central arbor 33 fixed to spool 7. When assembled spring 6 essentially acts as a spring motor. It is pre-configured such that cord 18 is wound up on it when spring 6 is in a relaxed state. When cord 18 is unwound from spool 7, spool 7 rotates. Arbor 33 rotates in kind with spool 7. This backwinds spring 6 on arbor 6 (winds it tighter at its turns nearest arbor 6). Spring 6 then acts as a spring motor to continuously urge spool 7 to turn in the direction to rewind cord 18 onto it. By selection of the appropriate characteristics of spring 6, the amount of winding force can be designed for unit 10. For example, in this embodiment, constant force spring 6 has an approximate 8 pound force. This is meant to work with a load on cord 18 of on the order of 8-12 lbs. Therefore, in this embodiment the weight of the load is at least from on the order of the force rating in lbs. of spring 6, and up to some additional number of pounds. This is selected so that spring 6 provides some assistance in lowering and raising the planter and its contents, but can require some manual pulling down and lifting up. This contributes to a very controlled movement of the planter in either direction, with relatively little manual exertion of the user (many times requires only one hand).

Figure 3:
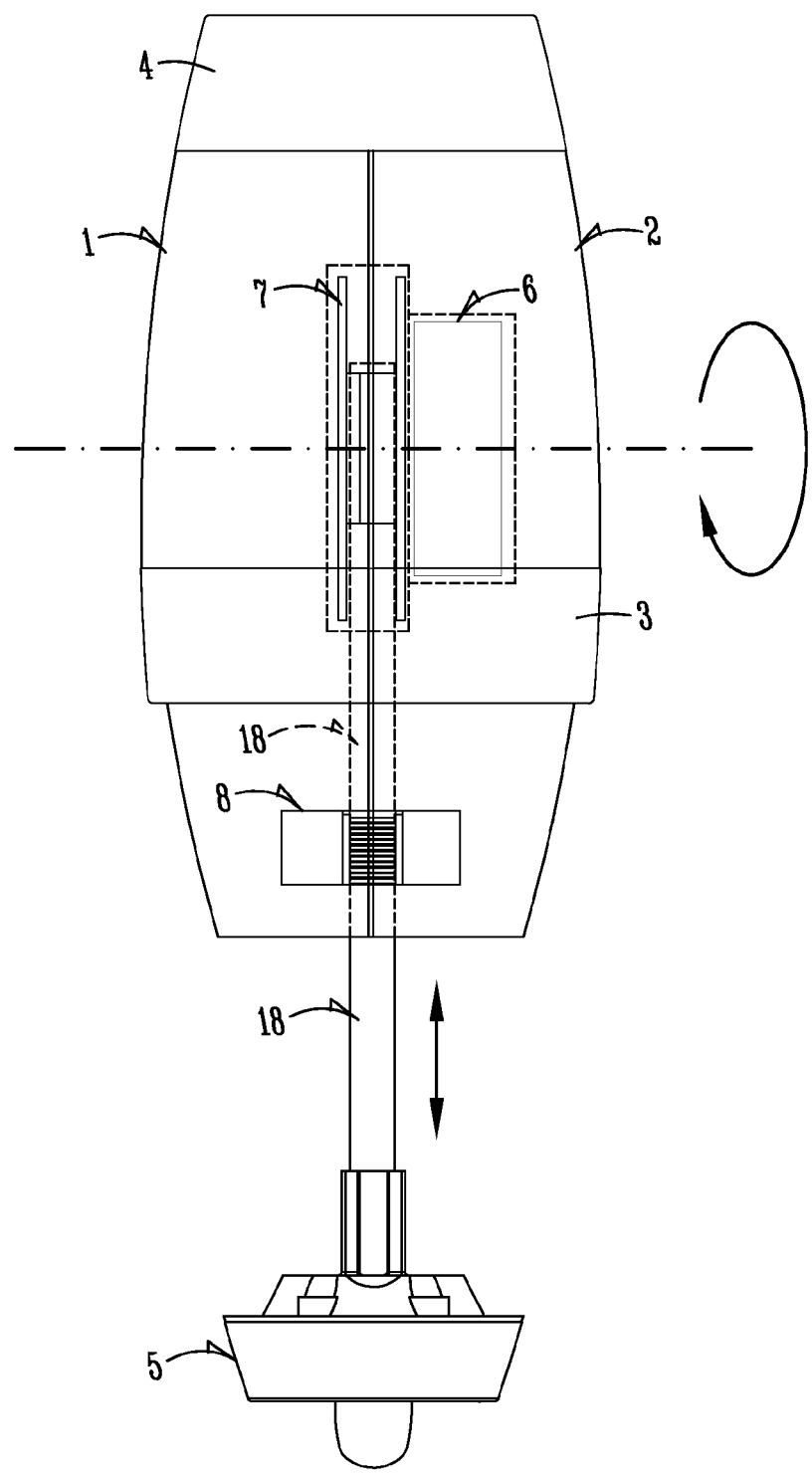
FIG. 3 is an assembled view of the embodiment 10 of FIG. 1A.

FIG. 3 shows assembled internal components of apparatus 10. By reference to FIGS. 4-26, assembly and operation of apparatus 10 will be described in more detail.

3. Assembly of Cord 18 to Spool 7 and Base 5

FIGS. 4-15B show how cord 18 would be connected at one end 18A to spool 7 in a manner to wind and unwind with rotation of spool 7, and at the opposite end 18E to base 5. Note how in this embodiment cord 18 is ribbed (multiple lateral ridges and depressions) along its length on side 18C while the other side 18B can be unribbed or smooth (see FIG. 5).

Rubber cord 18 is manufactured to be approximately 3.5 feet long from formed, enlarged head 18A to opposite end 18E, which includes an aperture. What is called push down member or assembly 21 comprises two similar pieces 21A and B that are fixed to opposite sides of cord 18 near end 18A by a screw 21C that clamps pieces 21A and B to cord 18 through a hole 18D in cord 18. The function of push down member 21 is to push or knock cinch 8 from a magnetically stored position when cord 18 is unwound to its most extended position. Therefore, member 21 is fixed at least approximately 5 inches from end 18A of cord 18. Member has a width slightly bigger that the width of cord 18 and a thickness on the order of that shown in FIGS. 4-7 relative cord 18.

One method of attachment of the two halves 21A and B to cord 18 is by a screw or bolt that extends through one half of push-down piece 21, through an opening formed in cord 18, and then into the other half of push-down piece 21. Other configurations of member 21 and methods of attachment to cord 18 are, of course, possible. The function of this push-down piece 21 will be further described later.

Figure 8A:
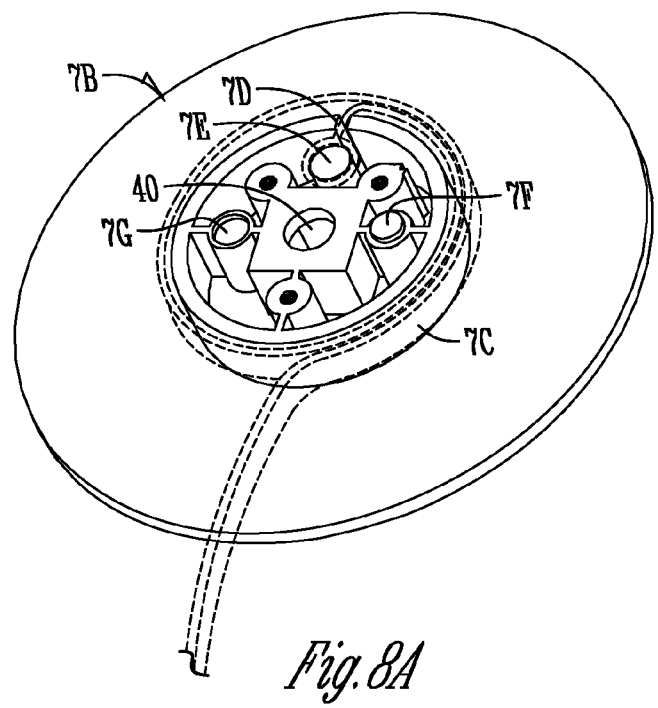
Figure 8B:
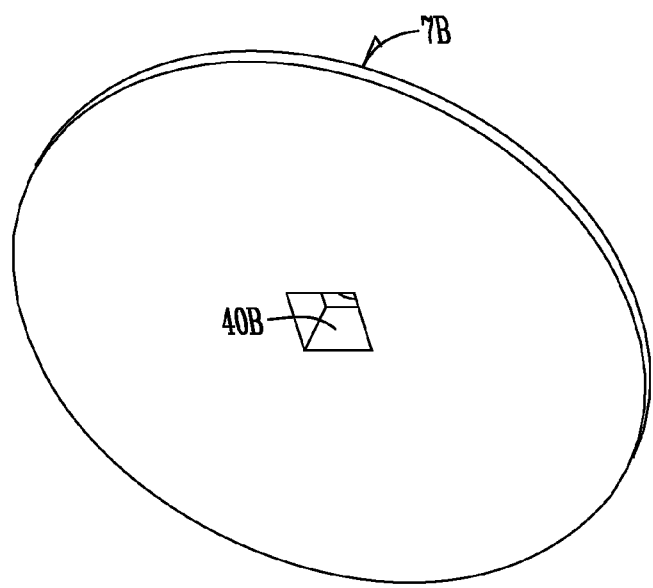
Figure 8C:
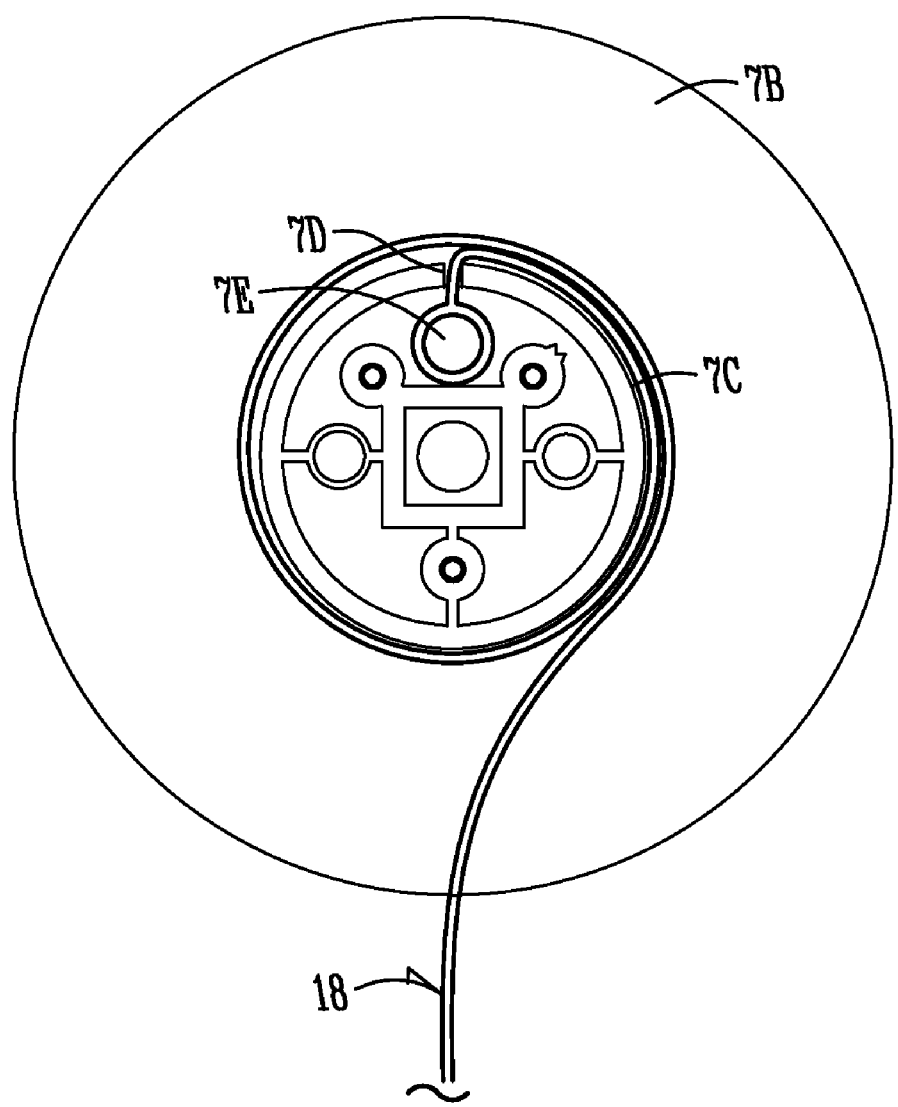

As indicated at FIGS. 5 and 6, push-down piece 21 should normally be positioned near the proximal end 18A of cord 18 relative to spool 7. Note that proximal 18A (FIG. 5) has an enlarged head. As illustrated diagrammatically in FIG. 8C, this allows it to be inserted through a slot 18C in rim 18D of half 7B of spool 7 capture it and allow cord 18 to be wound and unwound in kind with rotation of spool 7 around its rotational axis. FIG. 8C shows in more detail how head 18A of cord 18 is fixed to spool half 7B. Cylindrical wall 7C, which is concentric to the center opening in half 7B (defining its rotational axis), has a slot 7C through which the thickness of cord 18 can fit but which is much smaller than any dimension of head 18A. Head 18A is placed inside wall 7C with its through-bore pushed over post 7E adjacent to slot 7D. The thickness of cord 18 just adjacent head 18A is pushed into slot 7D in wall 7C. This fixes head 18A relative spool half 7B. The remainder of cord 18 can be wound or unwound relative to the exterior side of cylindrical wall 7C with rotation of spool 7 around its rotational axis. FIGS. 8A-D show additional details about spool half 7B.

FIGS. 9A and B show opposite spool half 7A. Spool half 7A is fastened to half 7B such that its center opening 40C is aligned with center openings 40A and B of half 7B. Half 7A has a cylindrical wall 7H and slot 7I which match up with wall 7C and slot 7D of half 7B when alignment boss and socket 7J and 7K of half 7A mate with complimentary socket 7G and boss 7F of half 7B. This ensures that slots 7D and 7I are in alignment as are cylindrical walls 7C and 7H. This captures cord head 18A and creates (by fasteners through holes such as illustrated in the Figures) a unitary spool 7 for winding and unwindeing cord 18. FIG. 6 shows that head 18A of cord 18 can be inserted as shown in FIG. 8C, and the opposite half 7A of spool 7 can be fixed to the other half 7B with, e.g., three screws (see FIG. 6).

4. Assembly of Pin 33 Between Spool 7 and Spring 6

Next, spool pin 33 is inserted through the openings along the rotational axis of spool 7 in the direction shown in FIG. 7. Pin 33 has an enlarged head 34, a squared-off portion 38, and a remaining portion 36 having a slot 36 extending longitudinally from its distal end substantially towards squared off portion 38. Additional details of pin 33 can be seen in FIGS. 10A-G.

Figure 8D:
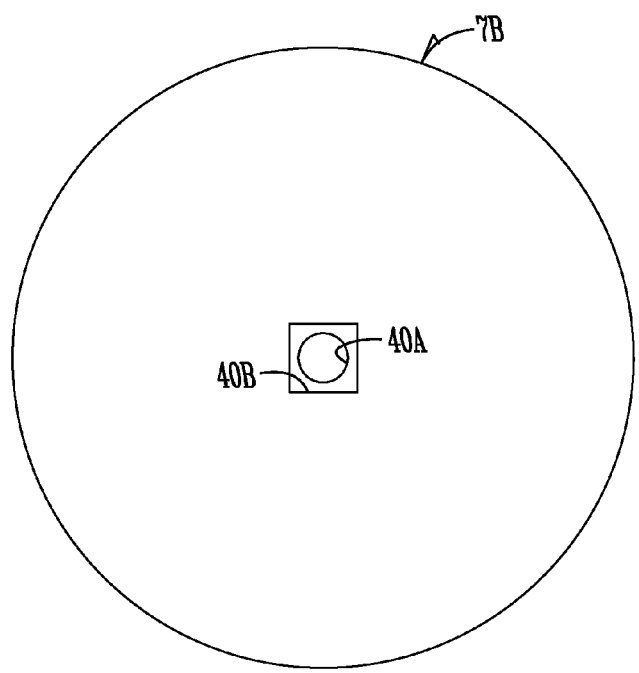
Figure 8E:
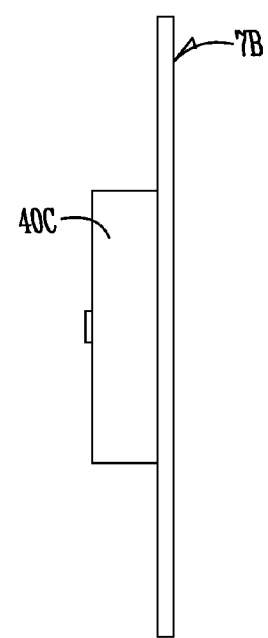

Pin 33 can be called a spool-to-spring pin or central arbor. It is a rotational axle for spool 7 as its opposite ends extend into complementary cylindrical receivers in housing halves 1 and 2 when unit 10 is finally assembled. Pin 33 is locked to spool 7 so that rotation of pin 33 causes in kind rotation of spool 7. When inserted into spool 7, squared-off portion 38 aligns with square opening 40B (FIG. 8D). Therefore, any rotation of spool 7 will cause the same rotation of pin 33. The squared-off portion 38 matingly fits into square portion 40B. Finally, pin 33 performs as a central arbor to spring 6.

As shown in FIG. 4, when pin 33 is fully installed in spool 7, its slotted or split end extends substantially away along its rotational axis. The longitudinal slot 36 is configured to fit across bent inner end 6A of spring 6 when it is mounted into its keeper or cup 81 in housing half 2 (see FIG. 16). The outer bent end 6B of flat, rectangular cross section constant force prestressed spring 6 slides into slot 82 in cylindrical keeper or cup 81 to hold that end 6B fixed relative to housing half 2. Note how a concentric wall outside of keeper 81 functions as a keeper or cup for spool 7.

End 36 of pin 33 extends outwardly from spool 7 (see FIG. 4) when inserted in spool 7. Cotter key 9 secures pin 33 in position relative to spool 7. Constant force spring 6, in this embodiment a coiled band of spring steel which is relaxed in what will be called an expanded state, fits basically adjacent the side of spool 7. Because the inner most end 6A of spring 6 slides into slot 36 of pin 33 and the outer end 6B is fixed to housing half 2, appropriate rotation of spool 7 in a direction opposite to the direction of curvature spring 6 assume din its relaxed, tightly wound co original condition. This would rotate pin 33 and cause the center turns of spring 6 to become increasing more tightly wound around pin 33, with each coil increasingly adjacent to the next coil. When the arbor is released, the spring element exerts a force causing the arbor to rotate from the condition where the spring element 6 is tightly backwound around the arbor to a condition where the spring element is bock would with the keeper. As long as spring 6 is maintained with the keeper, the spring 6 is always retained in a condition where it is wound in a direction of curvature opposite to the direction of curvature to which it was initially present.

In this embodiment, cord 18 would be wound up on spool 7 until base is at the bottom of housing halves 1 and 2, by hand before pin 33 is inserted across inner end 6A of spring 6. When finally assembled as unit 10, unwinding of cord 18 from spool 7 causes spool 7 to rotate, in turn causes pin 33 to rotate, in turn causing the inner coils of spring 6 to become tighter and tighter, and closer and closer. When cord 18 is released or pulling is stopped, spring 6 releases a winding force to attempt to return to its first somewhat expanded condition where spring element 6 is backwound adjacent the keeper. By techniques known in the art, and through selection of the appropriate spring 6, a certain constant winding force can be selected for spring 6. In this case it is an 8 lb. constant force pre-stressed flat coil spring such as is commercially available, e.g., from Hunter Spring Division of Ametek, Inc. under brand names SPIR'ATOR and NEG'ATOR. Further details about such springs, their characteristics and operation, can be found at U.S. Pat. No. 4,635,755 to inventor Arechaga, which is incorporated by reference herein. When spring 6 is wound by either a few turns of spool 7 or the maximum number of turns of spool 7 to fully unwind and extend cord 18, the returning or winding force exerted on pin 33 would be approximately a constant 8 lbs. It can be considered a spring motor, storing up energy has cord 18 unwinds and then applying that stored energy to turn spool 7 in a opposite or winding direction when cord 18 is released or when pulling force on cord 18 is less than the constant spring force of spring 6.

FIGS. 11 and 13 illustrate how the distal end of cord 18 is connected to base 5 at the bottom of the unit. Base 5 can be extended away from the bottom end of the unit while being attached to cord 18 a distance of approximately 3.5 feet, in this embodiment. Different lengths of cord 18 are, of course, possible, as are different configurations for cord 18.

FIGS. 4 to 10A-G show the assembly of spool 7 and cord 18, and provide details how it essentially is a spool inside apparatus 10 that when cord 18 starts out rolled up on spool 7 spring 6 is in a relaxed state. When cord 18 is pulled and spool 7 rotates to unwind cord 18, it begins tensioning spring 6. Spring 6 is, in this embodiment, a constant force spring such that whether cord 18 is unrolled slightly or to its full extended length, constant force spring 6 tries to roll cord 18 back up around the spool 7 and does so at a relatively constant force regardless of the length of unrolling. This is as known in the art. The opposite end of constant force spring 6 would be held in a fixed position within half 2 of the body of apparatus 10 to facilitate this. This is accomplished by a raised or bent outer end 6A of constant force spring 6 (see FIG. 16) that could, for example, be inserted in a slot in half 2 (in particular a slot 81 in the cylindrical wall or keeper 80 shown in FIG. 20A). Cylindrical wall 80 would provide a retainer for the exterior perimeter of constant force spring 6.

5. Base 5

The opposite end of cord 18 from spool 7, sometimes referred to herein as the distal end 18B, is affixed to base 5. FIGS. 11-15 show features of base 5 of the exemplary embodiment, including an optional LED PCB 60 that can be included in base 5.

FIG. 11 shows a three piece base assembly 5 including a cup-shaped bottom housing 5A, a top cover 5B, and an LED PCB 60 that is in-between bottom and top 5A and 5B. The distal end 18B of cord 18 is attached to cover 5B by a screw 59A (FIG. 14A) that clamps end 18B to the bottom side of cover 5B by passing through the hole in cord end 18E and into aperture 59 in cover 5B, after cord end 18E is threaded through channel 55 in push up member or finger 54 on the top of cover 5B and through a slot 58 that extends through cover 5B. In this manner, end 18E of cord 18 is guided and held securely to cover 5B. The three pieces 5A, 60, and 5B are then connectable into a final assembled form (see FIG. 1C by bolts (FIG. 11) that extend through aligned through-holes 75, 66, and 76 in pieces 5A, 60, and 5B respectively (see FIG. 11). Base assembly 5 is thus connected to cord 18 and can be moved up to the bottom of housing halves 1 and 2, or moved away from it as cord 18 allows. Further details of base 5 are set forth below.

Figure 13B:
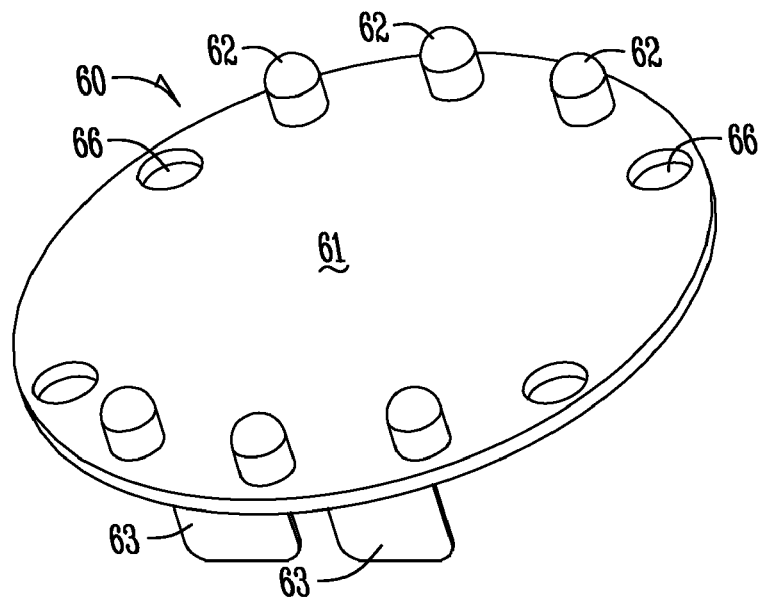

Bottom base housing 5A is shown in various isometric views in FIGS. 12A-G. Its exterior has opening 32 spanning an outer or lower side. The inner side can receive printed circuit board or PCB 60 having a bottom side 61 and six LEDs 62 on the top side, as shown in FIG. 13B. When assembled to bottom 5A, LEDs 62 extend at least partially through aligned openings 55 in base 5A. PCB 60 includes LEDs 62 as well as the required electronic circuitry to take direct current electrical power from batteries (two AA batteries) which can be operably positioned in receivers on interior side of top member 70 (FIGS. 14A-D). A switch 57 on the outside of bottom 5A allows the LEDs 62 to be manually turned on or off. Details of the PCB, batteries, switch, and LEDs are not included as these are commercially available and can be configured according to the skill of those skilled in the art. Top 5B includes two positions to which magnets 56L and R can be mounted. Corresponding magnets 57L and R can be mounted in aligned positions at the bottom of housing halves 1 and 2 (see, e.g., FIG. 20C) to assist in holding base 5 to the main portion of unit 10 (the assembled housing halves 1 and 2 and internal components) when base 5 is brought near or into abutment there.

Figure 14A:
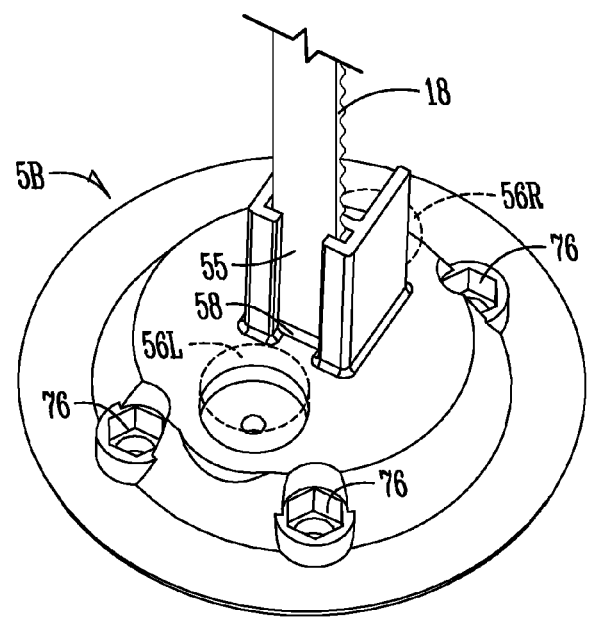
Figure 14B:
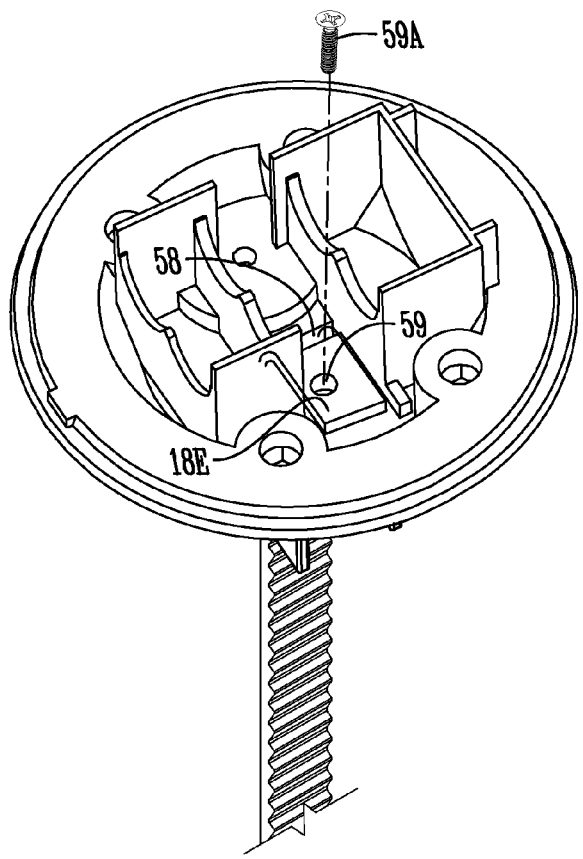
Figure 14C:
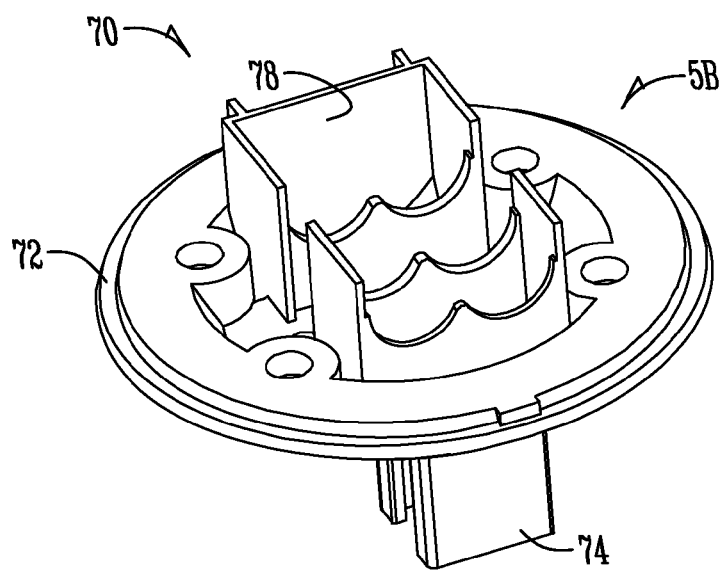
Figure 14D:
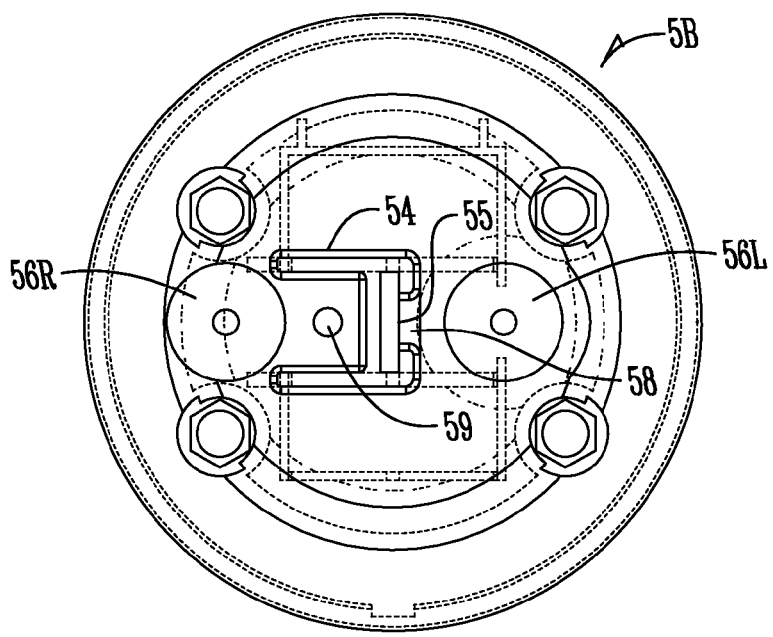

As illustrated in FIG. 14A, the distal end 18B of cord 18 is attached to base top 5B by threading it through channel 55 on post 54, through slot 58, and then bending it over to aperture 59. A screw or bolt 59A can be placed through an aperture in end 18B of cord 18 to fix it to top 70. A removable lid 52 (FIGS. 15A and B) can snap fit over an opening in the side wall of base bottom 5A to allow access to, and insertion and replacement of batteries to power LEDs 62.

As indicated diagrammatically in FIG. 27, LEDs 62, when turned on and when a planter is suspended from base 5, serve to illuminate the planter and/or its contents. The LED light sources 62, being mounted in the base, remain just above the planter 100 regardless of whether it is in a fully raised position or any position below that so long as planter 100 is attached to base 5. This option provides an additional attractive and functional feature.

The LEDs could be turned on when unit 30 is mounted and left on, or could be switched on and off as the user desires. Their long life can sometimes justify continuous operation so that the user does not have to reach or climb a ladder or foot stool to turn them on and off frequently. Alternatively, there could be a photoelectric eye or light detector that would automatically turn them on in low light or nighttime conditions and off if higher light or daylight conditions. In this example, LEDs 62 can be soft white LEDs commercially available from any of a variety of sources. Of course, different colors are possible, as are different types of light sources.

It is to be understood that the LEDs or any other illumination source are optional. Base 5 could be made of just top 5B and bottom 5A with cord 18 attached to it as previously described. The other function of upwardly extending finger 5D from top 5B will be explained with respect to operation of apparatus 10 once assembled.

6. Assembly of Spool/Spring/Pin/Cinch to Housing Halves 1 and 2

FIGS. 16-24 give further details about final assembly of apparatus 10. FIGS. 16 and 17 show generally how spring 6 would fit in to its cylindrical receiver or keeper 81 in housing half 2. In this embodiment, spring 6 is an 8-pound strength constant force spring.

Similarly, spool 7 would fit into its complementary cylindrical wall 89, which is outside of and concentric to the cylindrical wall of spring keeper 81. The split end of pin 33 would fit in receiver 83 and serve as a rotational bearing for that end of pin 33. Cord 18 would hand done, extend through opening 84 in wall 89 and further through opening 85 at the bottom of converging interior walls 86 and 87, and out of halve 2.

The other half 1 (see additional details in FIGS. 19A-C) includes substantially minor-image similar structures to half 2, except for the spring keeper 81. Half 1 has a cylindrical wall 91 of identical size to wall 89 of half 2 to retain the opposite side of spool 7, openings 94 and 95 which are complementary to openings 84 and 85 in half 2, and a receiver 93 to capture and serve as a rotational bearing for head 34 of pin 33.

Thus, when the interior components of unit 10 are assembled into half 2, half 1 is brought in alignment with and bolted to half 2, such that spring 6 is operably positioned in keeper 81, opposite ends of pin 33 are retained in the bearing members 83 and 93, spool 7 is retained in walls 89 and 91, and cord 18 extends through opening 84/94, past converging walls 87/97 and 86/96, and out opening 85/95 (with base 5 attached to its distal end 18E).

The following additional internal components are included in assembled halves 1 and 2.

Figure 24A:
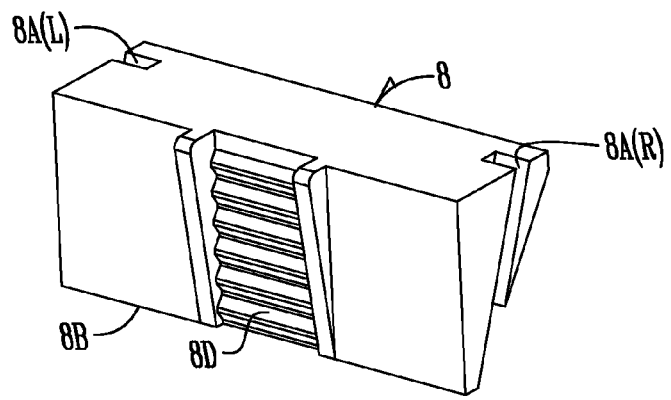
Figure 24B:
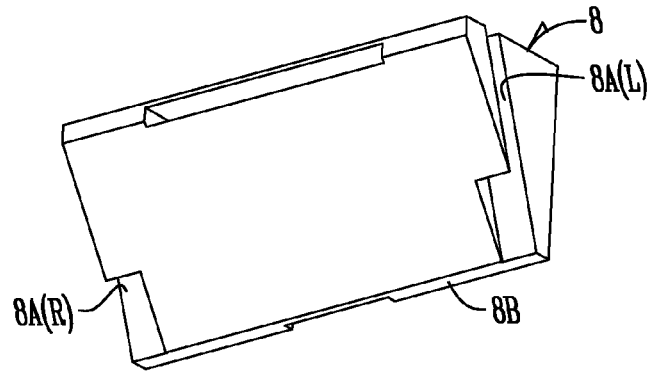
Figure 24C:
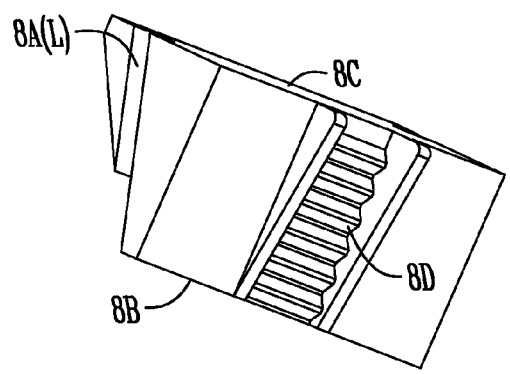
Figure 24D:
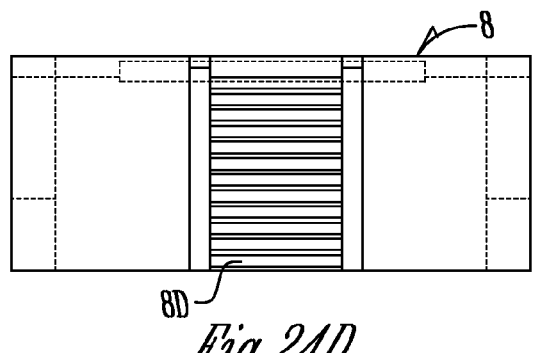
Figure 24E:
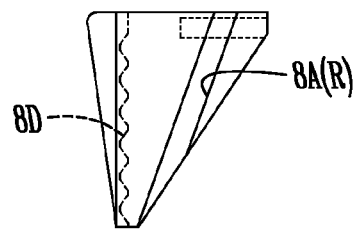
Figure 24F:
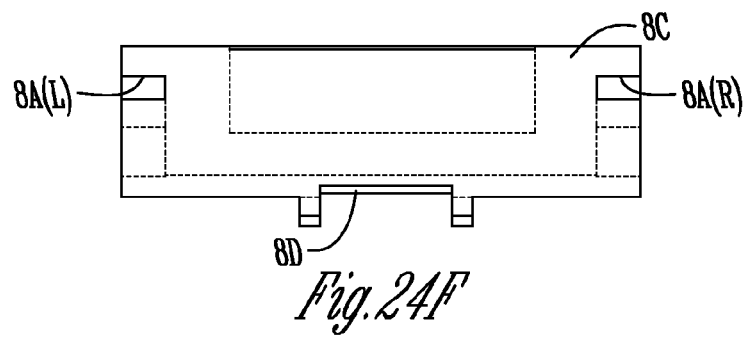
Figure 24G:
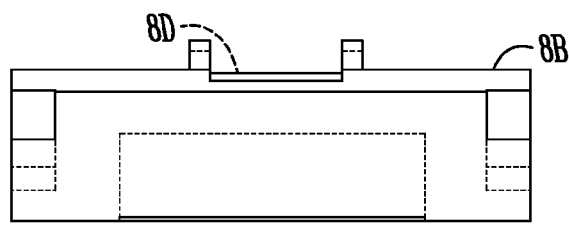

Cinch piece 8 is shown in exploded view in FIG. 16 and then installed position in housing half 2 in FIG. 17. It shows its relationship to spool and spring sub-assembly 7/6 once they are installed in housing half 2. FIGS. 24A-C show additional details of cinch 8. It is metal (e.g. die cast zinc alloy) and wedge-shaped having a leading edge 8B and a wider top 8C. Vertical slots 8A(L) and (R) mate with walls 80 and 90 in halves 1 and 2 to provide tracks upon which cinch 8 rides when halves 1 and 2 are assembled together. Cinch 8 can move up and down inside assembled halves 1 and 2 between a lowermost cinching position with edge 8B at opening 85/95, to clamp cord 18 against clamping surface 86/96, and a stored position where ferromagnetic cinch 8 is moved up and held by magnet 88 away from opening 85/95, as will be further discussed below. Cinch 8 is selected to be of a weight that will tend to move down by gravity inside unit 10 when not otherwise restrained.

As shown in detail in FIGS. 24A and C, a vertical channel 8D on the clamping side of cinch 8 has opposite raised side walls to retain cord 18, and a ribbed surface that interfaces with ribbed surface 18C of cord 18. The shape of cinch 8 is complementary to the converging walls 86/96 and 87/97 in halves 1 and 2 (see, e.g., FIG. 17).

As stated, magnet 88 is installed in complementary receivers in halves 1 and 2 (see FIG. 16). Two magnets 57L and R are installed in complementary receivers in halves 1 and 2 (see FIG. 16).

As can be appreciated, spool 7, when installed as shown in FIG. 17, would include pin 10 with cord 18, push-down piece 21, and base 5 all assembled as shown in FIG. 4. Cord 18, with attached base 5, would extend downwardly from housing half 2 in FIG. 17. Housing half 1 would then be screwed into position for example with bolts, nuts, screws, washers and lock washers. The final step would be to twist on top and bottom covers 4 and 3 (FIGS. 21A-B and 22A-B). In this embodiment they can be metal, plastic or composite material with copper plating finished with mirror polish and a clear coat. Housing halves can be ABS plastic, with PM-T2 texture and locking pins. One exemplary color for halves 1 and 2 is racing green. Base parts 5A and B can be ABS plastic with same texture, and color, as can be lid 52.

Spool halves 7A and B can also be ABS plastic with smooth finish and the same color. Pin 10 can be 300 series stainless steel with passivate finish.

7. Operation of Assembled Unit 10

By reference to the foregoing description of assembly of unit, FIGS. 25-26 illustrate additional details regarding operation of apparatus 10.

Unit 10 would come assembled with as shown in FIG. 1A. Base 5 would be in abutment with the lower end of halves 1 and 2. In this embodiment, it is held there primarily by matching magnets 56 and 57 in base 5 and the bottom of halves 1 and 2 (see FIG. 26B). Cord 18 would thus be wound up on spool and spring 6 would be in a first state in its keeper 81. Finger or push up member 54 on base 5 would extend into the bottom of housing 1/2. Its length and width is designed so that when base 5 is magnetically held there, finger or push up member 54 pushes cinch 8 on its tracks upwardly so that it is adjacent internal magnet 88. Cinch 8 is ferromagnetic and is therefore magnetically held by magnet in this stored position inside unit 10. Magnet 88 is a strong 2 lb. holding force magnet. Cinch is therefore held away from cinching position.

The user would add batteries through door 52 in base 5, and door 52 snapped into position. A planter or other item or load of between 8 and 12 total lbs. in weight would be selected for hanging, as well as a position. A hook or other connection would be placed at the appropriate position.

Unit 10 would then be suspended from the hook from the ceiling or other supporting structure and the planter or other item or load hung from base 5 (as in FIG. 1B). This arrangement can be left in place, as unit 10 is now suspending the planter in its fully raised position.

Unit 10 may also be operated by the user as follows.

To lower the planter, the user simply must grip the planter and pull gently down with enough force to overcome the 6 lb. magnet pairs 56/57, and then any spring force in spring 6. There is no need to pull hard, as unit 10 controls the planter moving downward. Downward movement causes cord 18 to extend, and thus unwind. Spool 7 and pin 33 would turn and begin winding spring 6 on pin 33. This regulates the downward movement by supplying some resistance to it.

Because cinch 8 is in the stored position (solid lines in FIG. 25), it allows cord 18 to unwind without interference. Planter 100 can therefore be pulled down and then lifted back up as desired. If lifted back up to fully raised position, magnets 56/57 would grab and hold base 5 to the main portion of unit 10 with 6 lbs. strong magnet force, which is deemed sufficient, with any winding force of spring 6 relative cord 18, to hold an 8-12 lb. planter 100 in fully raised position.

However, if it is desired to lower planter 100 and leave it lowered for a time, the following procedure is used. Planter 100 is grabbed and pulled down from its fully raised position as described above. Planter 100 is pulled downward until push down member 21 on cord 18 moves to and pushes or knocks cinch 8 from its stored position. This is illustrated diagrammatically in FIG. 25, where cord 18 is unwinding and moving downward as planter 100 is pulled down. Solid lines show member 21 coming to stored cinch 8. Dashed lines show how further downward movement of cord 18 moves member 21 past the cinch stored position and knocks it from magnet 88. Cinch 8 would fall by gravity into the area between vertical wall 86/96 and converging wall 87/97. Then, just a bit of further downward movement of cord 18 would cause cinch 8 to wedge towards the bottom of the converging walls. The ribs on cord 18 and the ribs on cinch 8, along with the friction of rubber cord 18 at that interface, would try to further drive cinch 8 down. This would clamp cord 18 against wall 86/96, and resist any movement of cord 18. Therefore, even though the full extension of cord 18 has wound up spring 6, cord 18 is clamped in place and planter 100 would stay at or near a fully lowered position.

FIG. 25 shows how cinch member 8 can be positioned along inclined wall 87/97 inside housing half 2. A more vertical wall 86/96 is on the opposite side. Cinch member 8, when in this lowered position, would essentially wedge or jam cord 18 against wall 86/96 by wedging or jamming action.

To either move planter 100 back to fully raised, or move it to some intermediate position between fully lowered and fully raised, the user simply grabs planter 100 and adds light upward lifting force on the planter. This would release at least some of the weight of planter 100 on base 5 and cord 18. The stored winding force of spring 6 would urge cord to wind on spool. The friction and ribbed interface between cord 18 and cinch 8 would then tend to move cinch 8 out of cinching position. As shown in FIG. 16A, this frees cord 18 to wind on spool 7. The user simply guides planter 100 upward to a desired intermediate position. Cinch 8 would drop down towards the cinching position by gravity and preliminarily cinch cord in place. When the user releases any grip or support of planter 100, its full weight would be added to cord 18, and friction between the ribbed side of cord 18 and the ribbed side of cinch 8 would wedge cinch 8 tighter to clamp cord 18 tighter against the interior walls of unit 10, and thus hold planter 100 at that intermediate position. Alternatively, the user could continue to lift planter 100 up and allow cord 18 to continue to be would up on spool 7 until base 5 reaches the bottom of the main portion (halves 1 and 2) of unit 10, and base 5 is magnetically grabbed and held in the fully raised position.

FIG. 26B illustrates how push up member 54 of base 5 would enter the interior of halves 1 and 2 and push cinch 8 up so that it also is grabbed and held in stored position by magnet 88 coincident with base 5 being grabbed and held by magnets 56 and 57.

Any of these functions can be repeated. Springs like spring 6 can have up to thousands of repetitions, and the magnets can have at least such operable life. Even if any of these components degrade in performance or fail, they can be replaced.

FIGS. 24A-G show specific details regarding cinch 8. In this embodiment it is made of zinc alloy using its as-cast surface finish (commercial grade). Note how it has a middle portion 8D that has lateral ridges. It is configured such that cord 18 (the side with complementary lateral ridges) would align therewith. The more weight or force downwardly, the more cinch 8 tries to wedge into the constricted opening at the bottom of walls 86/96 and 87/97.

Magnets 56 could be embedded or interference fit or other otherwise mounted in the top of base 5 (for example six-pound force magnets) complementary magnets 57 (six pound force magnets) could be embedded, interference fit, or otherwise fixed in the lower end of housing 1/2. When base 5 is brought all the way up into abutment with housing 1/2, the aligned magnets 56 and 57 could attract and hold it in position. As indicated, using six-pound magnets would allow up to a 12-pound planter 100 to be suspended even though cinch 8 is in its up position shown in solid lines in FIG. 25.

Selection of appropriate components, including commercially available six-pound constant force springs, can allow this automatic operation for many repetitions. For example, the constant force springs that are commercially available can reliably repeat this a thousand, two thousand, and even more times.

As can be seen from the appended figures and the foregoing description, the basic operating principle is a unit that can be hung from an elevated supporting structure such as ceiling, awning, or raised bracket, to which a planter or other item to be suspended can be hooked. The bottom or base of the unit can be separated from the remainder of the unit by pulling it downwardly. A cord is attached to that lowerable base. The cord is windable around an internal spool inside the unit which has a constant force spring continuously trying to wind the cord up on the spool. The constant force spring can be overcome by the weight of the load on cord 18 and/or pulling down on the base. Conversely, if the downward force on the base is released or diminished below the winding force of the spring, the cord will wind up and the base will travel automatically up to the bottom of the unit. Raising and lowering of the base, and thus anything suspended from the base, can therefore be accomplished easily and efficiently.

When in a lowered position, the user can then perform actions on the planter 100 or the contents of planter 100 (e.g. add soil and plants to the planter, water the plant, change the soil, add fertilizer, etc.) while the planter 100 is in a position up to approximately 3.5 feet lower than the remainder of the unit 1/2. Wedge 8 would lock cord 18 in place so that constant force spring 6 (or similar) would not be able to raise the planter.

As can be appreciated by the foregoing, the exemplary embodiment allows simple, efficient, and economical suspension of plants or other items at an elevated position but allows the item to be pulled down. It can then be returned. This can even be with one had of a user. It does not need any levers, buttons, or other devices released or tied or untied or the like. The internal working elements are encased aesthetically and substantially from environmental factors. When in a raised position, the unit has a unitary integrated appearance.

B. Options and Alternatives

It will be appreciated that the exemplary embodiment is but one way the invention can be made and used. Variations obvious to those skilled in the art would be included within the invention, which is not limited by the specific embodiment described herein.

As indicated previously, the size, specific shape, and materials used for the various components can vary according to need and desire. The scale of the device can vary according to need and desire.

One optional feature can be the illumination function as previously described. Another option is an optional plastic or metal pull clip 120 (see FIG. 1B where clip 120 is exploded from planter 100, and FIG. 1C where it is attached to planter 100). Prongs of clip 120 can be compressed together and hooks on the ends of the prongs inserted into an opening on the bottom of planter (e.g. a 1 inch diameter drainage hole). When the prongs are released, they spring apart and the hooks holds clip 120 to planter 100. Clip 100 is then a convenient location to grab and pull or push to lower and raise planter 100.

Other options and variations such as are within the skill of those skilled in the art will be included within the invention.

What is claimed is:

1. A device to allow suspension of a load and selective lowering of the load from an elevated structure comprising:
   i. a housing having an upper end with a connection adapted for suspension from an elevated structure and an opposite lower end;
   ii. a rotatable spool within the housing;
   iii. a biasing member operably connected to the spool and providing a limited force to urge the spool to rotate in a first direction;
   iv. a cord connected to and windable on rotation of the spool in the first direction, the cord being unwindable from the lower end of the housing upon rotation of the spool in a second direction, the cord having an unwound length that is substantially longer than the diameter of the spool;
   v. a base attached to the distal end of the cord, the base being selectively moveable between abutment with the lower end of the housing and a remote position away from the housing associated with the length of the cord, the base including a connection adapted to suspend a load; and
   vi. a cinching member positioned away from and below the spool in the housing and translatable between a first position and a cinching position providing clamping action of the cord against a clamping surface of the housing to deter movement of the cord relative to the housing to set the length of unwound cord relative to the housing.

2. The device of claim 1 wherein the biasing member comprises a constant force spring.

3. The device of claim 1 wherein the cord comprises an elastomeric band.

4. The device of claim 1 further comprising opposed surfaces inside the housing having complementary shapes to surfaces of the cinching member, wherein the cord is adjacent to or in abutment with one of the opposing surfaces, and the cinching member, when translated to the cinching position, increasingly clamps the cord against the said one surface.

5. The device of claim 1 wherein the first position of the cinching member comprises a stored position associated with a surface inside the housing, the stored position holding the cinching member away from a cinching position.

6. The device of claim 5 wherein the cinching member is ferromagnetic and a magnet is positioned at the stored position such that when the cinching member is brought adjacent the stored position, the magnet holds the cinching member in the stored position.

7. The device of claim 1 wherein the base further comprises a magnet and the housing has a bottom, the bottom of the housing comprises a magnet such that when the base is brought adjacent the bottom of the housing, the base is magnetically attracted to the bottom of the housing.

8. The device of claim 1 wherein the base includes at least one light source having a lighting direction away from the base.

9. The device of claim 1 wherein the load comprises a planter of less than 10 pounds weight and the housing is less than one foot long and one half foot wide.

10. The device of claim 1 wherein the cord is ribbed.

11. A device to allow suspension of a load and selective lowering of the load from an elevated structure comprising:
   i. a housing having a connection adapted for suspension from an elevated structure;
   ii. a rotatable spool within the housing;
   iii. a biasing member operably connected to the spool and providing a limited force to urge the spool to rotate in a first direction;
   iv. a cord connected to and windable on rotation of the spool in the first direction, the cord being unwindable from the housing upon rotation of the spool in a second direction, the cord having an unwound length that is substantially longer than the diameter of the spool;
   v. a connection adapted to suspend a load attached to the distal end of the cord; and
   vi. a cinching member positioned away from and below the spool in the housing and translatable between a first position and a cinching position providing clamping action of the cord against a clamping surface of the housing to deter movement of the cord relative to the housing to set the length of unwound cord relative to the housing.

* * * * *